United States Patent
Suarez et al.

(10) Patent No.: US 10,489,613 B2
(45) Date of Patent: Nov. 26, 2019

(54) SYSTEM AND METHOD OF CONTROLLING LIGHT EMISSIONS OF DISPLAYS

(71) Applicant: Dell Products L.P., Round Rock, TX (US)

(72) Inventors: Aida Isabel Suarez, Austin, TX (US); Ray Vivian Kacelenga, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 80 days.

(21) Appl. No.: 15/813,732

(22) Filed: Nov. 15, 2017

(65) Prior Publication Data

US 2019/0147196 A1 May 16, 2019

(51) Int. Cl.
*G06F 21/84* (2013.01)

(52) U.S. Cl.
CPC ...... *G06F 21/84* (2013.01); *G06F 2200/1614* (2013.01)

(58) Field of Classification Search
None
See application file for complete search history.

(56) References Cited

U.S. PATENT DOCUMENTS

| | | |
|---|---|---|
| 4,788,094 A | 11/1988 | Morita et al. |
| 4,853,769 A | 8/1989 | Kollin |
| 7,817,361 B2 | 10/2010 | Mimura et al. |
| 7,973,749 B2 | 7/2011 | Uehara et al. |
| 8,213,082 B2 | 7/2012 | Gaides et al. |
| 8,289,458 B2 | 10/2012 | Walton et al. |
| 8,503,122 B2 | 8/2013 | Liu et al. |
| 8,917,267 B2 | 12/2014 | Miyasaka et al. |
| 9,229,253 B2 | 1/2016 | Schwartz et al. |
| 2005/0219445 A1 | 10/2005 | Kubo |

(Continued)

FOREIGN PATENT DOCUMENTS

JP   2007272065   10/2007

OTHER PUBLICATIONS

Berger, Stefan, et al. "Using symbiotic displays to view sensitive information in public." *Pervasive Computing and Communications, 2005. PerCom 2005. Third IEEE International Conference on.* IEEE, 2005; 10 pages.

(Continued)

*Primary Examiner* — Michelle Chin
(74) *Attorney, Agent, or Firm* — Baker Botts L.L.P.

(57) ABSTRACT

In one or more embodiments, a display device may display information via light emissions via a first orientation, and an anisotropic material, of the display device, may obscure the information along a first axis of the display device and within a first threshold angle. In one or more embodiments, it may be determined that the first orientation changes to a second orientation, and in response, the anisotropic material may obscure the information along a second axis of the display device and within a second threshold angle. In one or more embodiments, the anisotropic material may permit information along the first axis of the display device to be viewed by a person. In one or more embodiments, determining that the first orientation changes to the second orientation may be based at least on data from at least one of an electronic accelerometer, an electronic gyroscope, and an electronic magnetometer.

20 Claims, 18 Drawing Sheets

(56) References Cited

U.S. PATENT DOCUMENTS

| | | |
|---|---|---|
| 2006/0238664 A1* | 10/2006 | Uehara ............... G02B 6/0036 349/1 |
| 2007/0222915 A1 | 9/2007 | Niioka et al. |
| 2009/0153783 A1 | 6/2009 | Umemoto |
| 2010/0017906 A1 | 1/2010 | Albertsen et al. |
| 2012/0154885 A1 | 6/2012 | Jones et al. |
| 2013/0201573 A1 | 8/2013 | Shiota |
| 2014/0056028 A1* | 2/2014 | Nichol ............... G02B 6/0028 362/611 |
| 2014/0204464 A1 | 7/2014 | Halverson et al. |
| 2016/0062114 A1 | 3/2016 | Amarilio et al. |
| 2016/0334898 A1 | 11/2016 | Kwak et al. |
| 2017/0116425 A1 | 4/2017 | Chang |
| 2017/0175976 A1 | 6/2017 | Johnson et al. |
| 2017/0371077 A1 | 12/2017 | Okamoto |
| 2018/0149772 A1 | 5/2018 | Eo et al. |
| 2018/0321431 A1 | 11/2018 | Kim et al. |

OTHER PUBLICATIONS

3M. "Advanced Solutions for Light Enhancement, Control and Protection." 3M Mobile Interative Solutions Division, 2011; 6 pages.

A. Lee et al., "6.2: Integrated TFT-LCD Timing Controllers With RSDS Column Driver Interface", Interface Products, National Semiconductor Corporation, 5 pages, 2011.

Ko-Wei Chien et al., "Polarized Backlight Based on Selective Total Internal Reflection at Microgrooves", Applied Optics/vol. 43, No. 24/Aug. 20, 2004, 5 pages.

* cited by examiner

SYSTEM AND METHOD OF CONTROLLING LIGHT EMISSIONS OF DISPLAYS

BACKGROUND

Field of the Disclosure

This disclosure relates generally to information handling systems and more particularly to privacy for displays associated with information handling systems.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

In one or more embodiments, a display device may display information via light emissions of the display device via a first orientation, and an anisotropic material, of the display device, may obscure the information along a first axis of the display device and within a first threshold angle. For example, the anisotropic material may include first strips, having a first height, associated with the first axis of the display device and may include second strips, having a second height, associated with a second axis of the display device. In one or more embodiments, the first strips and the second strips may include non-cubic crystal structures. For example, the non-cubic crystal structures of the first strips may restrict light emissions of the display device via absorbing at least a portion of the light emissions, along the first axis of the display device and within the first threshold angle, and/or diffusing the at least portion of the light emissions, along the first axis of the display device and within the first threshold angle.

In one or more embodiments, it may be determined that the first orientation changes to a second orientation, and in response to determining that the first orientation changes to the second orientation, the anisotropic material may obscure the information along the second axis of the display device and within the second threshold angle. For example, the non-cubic crystal structures of the second strips may restrict light emissions of the display device via absorbing at least a portion of the light emissions, along the second axis of the display device and within the second threshold angle, and/or diffusing the at least portion of the light emissions, along the second axis of the display device and within the second threshold angle. In one or more embodiments, determining that the first orientation changes to the second orientation may include receiving data from at least one of an electronic accelerometer, an electronic gyroscope, and an electronic magnetometer and determining that the first orientation changes to the second orientation based at least on the data from the at least one of the electronic accelerometer, the electronic gyroscope, and the electronic magnetometer. For example, the data from the at least one of the electronic accelerometer, the electronic gyroscope, and the electronic magnetometer may be based at least on an angle with respect to a gravitational center of a planet (e.g., Earth). In one or more embodiments, the anisotropic material may permit information along the first axis of the display device to be viewed by a person. In one or more embodiments, determining that the first orientation changes to the second orientation may be based at least on data from at least one of an electronic accelerometer, an electronic gyroscope, and an electronic magnetometer.

In one or more embodiments, user input may be received that indicates that the anisotropic material may obscure the information along the second axis of the display device and within the second threshold angle. For example, a user may provide the user input to an information handling system to control the anisotropic material may obscure the information along the first axis and/or the second axis of the display device. In one instance, in response to user input, processor instructions executing via a processor of the information handling system may permit, via the anisotropic material, the information along the first axis of the display device to be viewed by a person or may obscure the information along the first axis of the display device. In a second instance, in response to user input, processor instructions executing via the processor of the information handling system may permit, via the anisotropic material, the information along the second axis of the display device to be viewed by a person or may obscure the information along the second axis of the display device. In another instance, in response to user input, processor instructions executing via the processor of the information handling system may permit, via the anisotropic material, the information along the first axis and the second axis of the display device to be viewed by a person or may obscure the information along the first axis and the second axis of the display device.

BRIEF DESCRIPTION OF THE DRAWINGS

For a more complete understanding of the present disclosure and its features/advantages, reference is now made to the following description, taken in conjunction with the accompanying drawings, which are not drawn to scale, and in which.

DETAILED DESCRIPTION

Figure 1A:
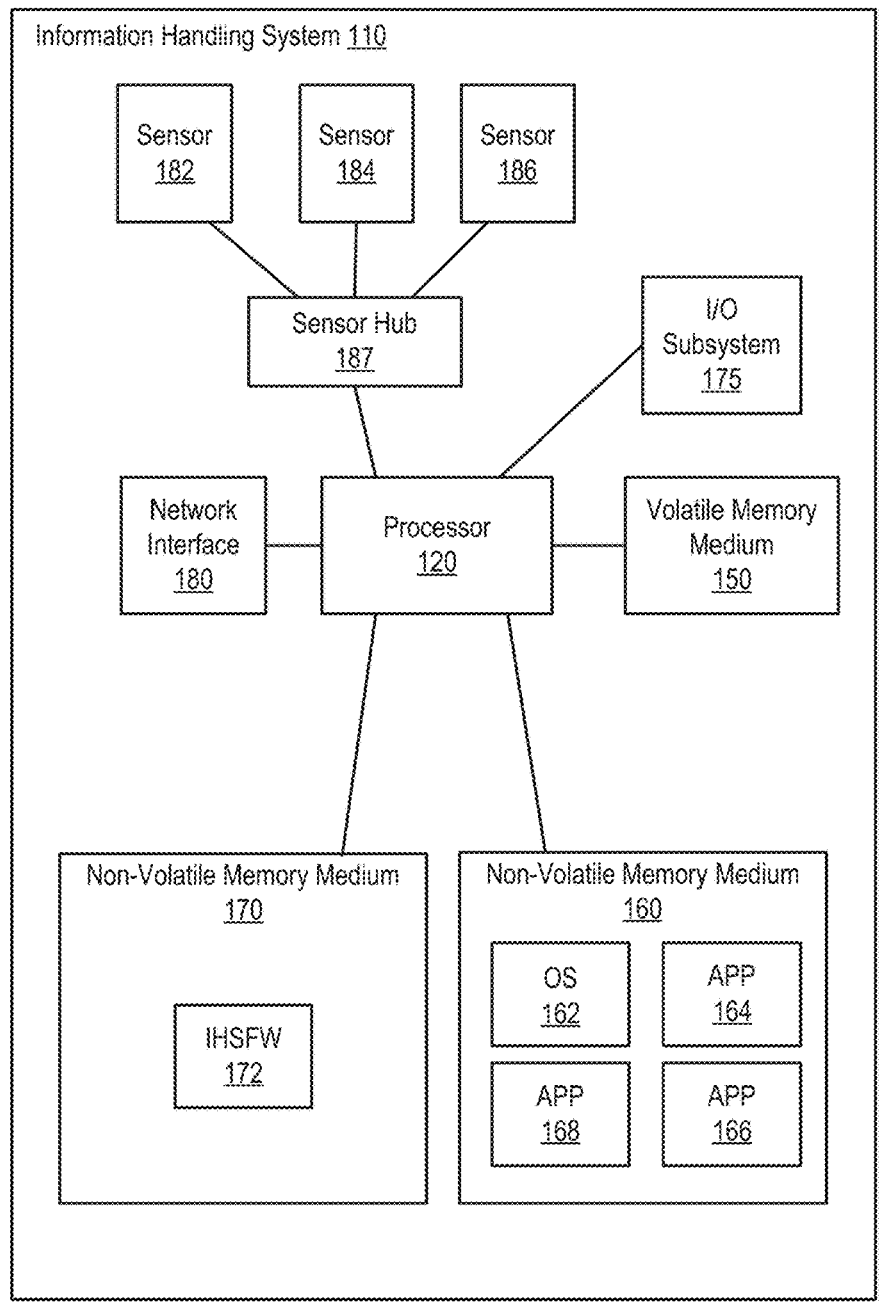
FIG. 1A illustrates an example of an information handling system, according to one or more embodiments.

In the following description, details are set forth by way of example to facilitate discussion of the disclosed subject matter. It should be apparent to a person of ordinary skill in the field, however, that the disclosed embodiments are exemplary and not exhaustive of all possible embodiments.

As used herein, a reference numeral refers to a class or type of entity, and any letter following such reference numeral refers to a specific instance of a particular entity of that class or type. Thus, for example, a hypothetical entity referenced by '12A' may refer to a particular instance of a particular class/type, and the reference '12' may refer to a collection of instances belonging to that particular class/type or any one instance of that class/type in general.

In one or more embodiments, a display device may be utilized via various orientations and/or angles. In one example, the display device may be rotated by ninety degrees. For instance, the display device may be rotated from a landscape orientation to a portrait orientation. In another example, the display device may be rotated by one hundred and eighty degrees. For instance, the display device may be associated with a laptop that includes tablet-like features.

In one or more embodiments, one or more privacy filters may include tiny blinds called micro louvers, which may be built into the one or more privacy filters. For example, the one or more privacy filters may allow light emissions to pass straight on through but not sideways. For instance, the one or more privacy filters may block or obscure the light emissions at an angle greater than thirty degrees on either side of a screen or display device. In one or more embodiments, the one or more privacy filters may allow a user of an information handling system to see what is on the screen or display device, and any bystander's view of content, via the light emissions, may be blocked or obscured when viewing the screen or display device outside of a viewing region (e.g., greater than thirty degrees on either side of the screen or display device). For example, the one or more privacy filters may be controllable by the user. For instance, the one or more privacy filters may be turned on or off based on input from the user.

In one or more embodiments, privacy of information conveyed via the display device may be conveyed after the display device is rotated. For example, the display device may include a switchable diffuser that is configured to provide privacy of information conveyed via the display device after the display device is rotated and/or after an orientation of the display device is changed. For instance, the switchable diffuser that is configured to provide privacy of information conveyed via the display device may provide privacy protection associated with left side and/or right side intrusions and may continue to provide privacy protection associated with left-side and/or right-side intrusions after the display device is rotated and/or after an orientation of the display device is changed.

In one or more embodiments, privacy of information conveyed via the display device may be associated with a top down and/or bottom up intrusions. In one example, a person looking down on the display device may not be able to decipher information conveyed via the display device. In another example, the display device may be on or within a horizontal surface (e.g., a surface of a table, a desk, a counter, etc.), and a person looking towards a top of the display device may not be able to decipher information conveyed via the display device.

In one or more embodiments, a display device may include a switchable diffuser of polymer dispersed liquid crystals (PDLC). For example, the switchable diffuser may provide privacy of information conveyed via the display device. For instance, the information conveyed via the display device may not be viewed by a person along an axis of the display device and within a threshold angle. In one or more embodiments, the PDLC may include non-cubic crystal structures that restrict the light emissions of the display device. For example, the non-cubic crystal structures may absorb at least a portion of light emissions, along the axis of the display device and within the threshold angle, and/or may diffuse the at least portion of the light emissions, along the axis of the display device and within the threshold angle.

Turning now to FIG. 1A, an example of an information handling system is illustrated, according to one or more embodiments. An information handling system (IHS) 110 may include a hardware resource or an aggregate of hardware resources operable to compute, classify, process, transmit, receive, retrieve, originate, switch, store, display, manifest, detect, record, reproduce, handle, and/or utilize various forms of information, intelligence, or data for business, scientific, control, entertainment, or other purposes, according to one or more embodiments. For example, IHS 110 may be a personal computer, a desktop computer system, a laptop computer system, a server computer system, a mobile device, a personal digital assistant (PDA), a consumer electronic device, an electronic music player, an electronic camera, an electronic video player, a wireless access point, a network storage device, or another suitable device and may vary in size, shape, performance, functionality, and price. In one or more embodiments, components of IHS 110 may include one or more storage devices, one or more communications ports for communicating with external devices as well as various input and output (I/O) devices, such as a keyboard, a mouse, and a video display, among others. In one or more embodiments, IHS 110 may include one or more buses operable to transmit communication between or among two or more hardware components. In one example, a bus of IHS 110 may include one or more of a memory bus, a peripheral bus, and a local bus, among others. In another example, a bus of IHS 110 may include one or more of a Micro Channel Architecture (MCA) bus, an Industry Standard Architecture (ISA) bus, an Enhanced ISA (EISA) bus, a Peripheral Component Interconnect (PCI) bus, Hyper-Transport (HT) bus, an inter-integrated circuit ($I^2C$) bus, a serial peripheral interface (SPI) bus, a low pin count (LPC) bus, an enhanced serial peripheral interface (eSPI) bus, a universal serial bus (USB), a system management bus (SM-Bus), and a Video Electronics Standards Association (VESA) local bus, among others.

In one or more embodiments, IHS 110 may include firmware that controls and/or communicates with one or more hard drives, network circuitry, one or more memory devices, one or more I/O devices, and/or one or more other peripheral devices. For example, firmware may include software embedded in an IHS component utilized to perform tasks. In one or more embodiments, firmware may be stored in non-volatile memory, such as storage that does not lose stored data upon loss of power. In one example, firmware associated with an IHS component may be stored in non-volatile memory that is accessible to one or more IHS components. In another example, firmware associated with an IHS component may be stored in non-volatile memory that may be dedicated to and includes part of that component. For instance, an embedded controller may include firmware that may be stored via non-volatile memory that may be dedicated to and includes part of the embedded controller.

As shown, IHS 110 may include a processor 120, a volatile memory medium 150, non-volatile memory media 160 and 170, an I/O subsystem 175, a network interface 180, sensors 182-186, and a sensor hub 187. As illustrated, volatile memory medium 150, non-volatile memory media 160 and 170, I/O subsystem 175, network interface 180, and sensor hub 187 may be communicatively coupled to processor 120. In one or more embodiments, sensors 182-186 may be communicatively coupled to processor 120 via sensor hub 187. In one example, sensor hub 187 may be a discrete sensor hub. In another example, sensor hub 187 may be an integrated sensor hub. For instance, sensor hub may be integrated into a system on chip that includes processor 120. In one or more embodiments, one or more of sensors 182-186 may include one or more of a thermistor, a Hall effect sensor, an accelerometer, and a gyroscope, among other sensors. For example, the Hall effect sensor may be utilized in determining an opening and/or a closing of a lid of a laptop IHS.

In one or more embodiments, one or more of volatile memory medium 150, non-volatile memory media 160 and 170, I/O subsystem 175, and network interface 180 may be communicatively coupled to processor 120 via one or more buses, one or more switches, and/or one or more root complexes, among others. In one example, one or more of volatile memory medium 150, non-volatile memory media 160 and 170, I/O subsystem 175, and network interface 180 may be communicatively coupled to processor 120 via one or more PCI-Express (PCIe) root complexes. In another example, one or more of an I/O subsystem 175 and a network interface 180 may be communicatively coupled to processor 120 via one or more PCIe switches.

In one or more embodiments, the term "memory medium" may mean a "storage device", a "memory", a "memory device", a "tangible computer readable storage medium", and/or a "computer-readable medium". For example, computer-readable media may include, without limitation, storage media such as a direct access storage device (e.g., a hard disk drive, a floppy disk, etc.), a sequential access storage device (e.g., a tape disk drive), a compact disk (CD), a CD-ROM, a digital versatile disc (DVD), a random access memory (RAM), a read-only memory (ROM), a one-time programmable (OTP) memory, an electrically erasable programmable read-only memory (EEPROM), and/or a flash memory, a solid state drive (SSD), or any combination of the foregoing, among others.

In one or more embodiments, one or more protocols may be utilized in transferring data to and/or from a memory medium. For example, the one or more protocols may include one or more of small computer system interface (SCSI), Serial Attached SCSI (SAS) or another transport that operates with the SCSI protocol, advanced technology attachment (ATA), serial ATA (SATA), a USB interface, an Institute of Electrical and Electronics Engineers (IEEE) 1394 interface, a Thunderbolt interface, an advanced technology attachment packet interface (ATAPI), serial storage architecture (SSA), integrated drive electronics (IDE), or any combination thereof, among others.

Volatile memory medium 150 may include volatile storage such as, for example, RAM, DRAM (dynamic RAM), EDO RAM (extended data out RAM), SRAM (static RAM), etc. One or more of non-volatile memory media 160 and 170 may include nonvolatile storage such as, for example, a read only memory (ROM), a programmable ROM (PROM), an erasable PROM (EPROM), an electrically erasable PROM, NVRAM (non-volatile RAM), ferroelectric RAM (FRAM), a magnetic medium (e.g., a hard drive, a floppy disk, a magnetic tape, etc.), optical storage (e.g., a CD, a DVD, a BLU-RAY disc, etc.), flash memory, a SSD, etc. In one or more embodiments, a memory medium can include one or more volatile storages and/or one or more nonvolatile storages.

In one or more embodiments, network interface 180 may be utilized in communicating with one or more networks and/or one or more other information handling systems. In one example, network interface 180 may enable IHS 110 to communicate via a network utilizing a suitable transmission protocol and/or standard. In a second example, network interface 180 may be coupled to a wired network. In a third example, network interface 180 may be coupled to an optical network. In another example, network interface 180 may be coupled to a wireless network.

In one or more embodiments, network interface 180 may be communicatively coupled via a network to a network storage resource. For example, the network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, an Internet or another appropriate architecture or system that facilitates the communication of signals, data and/or messages (generally referred to as data). For instance, the network may transmit data utilizing a desired storage and/or communication protocol, including one or more of Fibre Channel, Frame Relay, Asynchronous Transfer Mode (ATM), Internet protocol (IP), other packet-based protocol, Internet SCSI (iSCSI), or any combination thereof, among others.

In one or more embodiments, processor 120 may execute processor instructions in implementing one or more systems, flowcharts, methods, and/or processes described herein. In one example, processor 120 may execute processor instructions from one or more of memory media 150-170 in implementing one or more systems, flowcharts, methods, and/or processes described herein. In another example, processor 120 may execute processor instructions via network interface 180 in implementing one or more systems, flowcharts, methods, and/or processes described herein.

In one or more embodiments, processor 120 may include one or more of a system, a device, and an apparatus operable to interpret and/or execute program instructions and/or process data, among others, and may include one or more of a microprocessor, a microcontroller, a digital signal processor (DSP), an application specific integrated circuit (ASIC), and another digital or analog circuitry configured to interpret and/or execute program instructions and/or process data, among others. In one example, processor 120 may interpret and/or execute program instructions and/or process data stored locally (e.g., via memory media 150-170 and/or another component of IHS 110). In another example, processor 120 may interpret and/or execute program instructions and/or process data stored remotely (e.g., via a network storage resource).

In one or more embodiments, I/O subsystem 175 may represent a variety of communication interfaces, graphics interfaces, video interfaces, user input interfaces, and/or peripheral interfaces, among others. For example, I/O subsystem 175 may include one or more of a touch panel and a display adapter, among others. For instance, a touch panel may include circuitry that enables touch functionality in conjunction with a display that is driven by a display adapter.

As shown, non-volatile memory medium 160 may include an operating system (OS) 162, and applications (APPs) 164-168. In one or more embodiments, one or more of OS 162 and APPs 164-168 may include processor instructions executable by processor 120. In one example, processor 120 may execute processor instructions of one or more of OS 162 and APPs 164-168 via non-volatile memory medium 160. In another example, one or more portions of the processor instructions of the one or more of OS 162 and APPs 164-168 may be transferred to volatile memory medium 150, and processor 120 may execute the one or more portions of the processor instructions of the one or more of OS 162 and APPs 164-168 via volatile memory medium 150.

As illustrated, non-volatile memory medium 170 may include information handling system firmware (IHSFW) 172. In one or more embodiments, IHSFW 172 may include processor instructions executable by processor 120. For example, IHSFW 172 may include one or more structures and/or functionalities of one or more of a basic input/output system (BIOS), an Extensible Firmware Interface (EFI), a Unified Extensible Firmware Interface (UEFI), and an Advanced Configuration and Power Interface (ACPI), among others. In one instance, processor 120 may execute processor instructions of IHSFW 172 via non-volatile memory medium 170. In another instance, one or more portions of the processor instructions of IHSFW 172 may be transferred to volatile memory medium 150, and processor 120 may execute the one or more portions of the processor instructions of IHSFW 172 via volatile memory medium 150.

In one or more embodiments, processor 120 and one or more components of IHS 110 may be included in a system-on-chip (SoC). For example, the SoC may include processor 120 and a platform controller hub (not specifically illustrated).

Figure 1B:
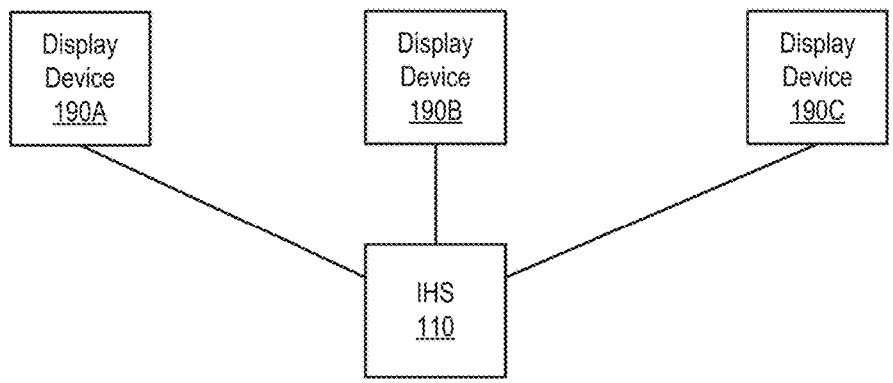
FIG. 1B illustrates an example of an information handling system coupled to one or more display devices, according to one or more embodiments.

Turning now to FIG. 1B, an example of an information handling system coupled to one or more display devices is illustrated, according to one or more embodiments. As shown, IHS 110 may be coupled to one or more of display devices 190A-190C.

Figure 1C:
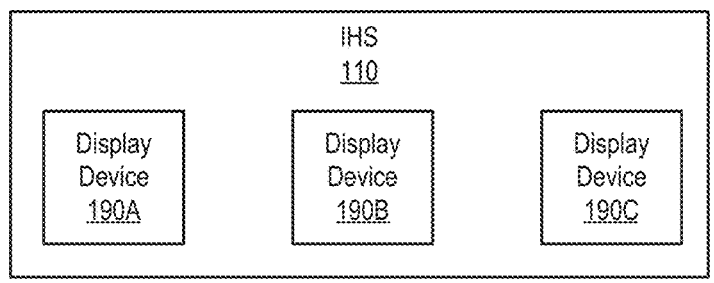
FIG. 1C illustrates an example of an information handling system that includes one or more display devices, according to one or more embodiments.

Turning now to FIG. 1C, an example of an information handling system that includes one or more display devices is illustrated, according to one or more embodiments. As shown, IHS 110 may include one or more of display devices 190A-190C.

Figure 2A:
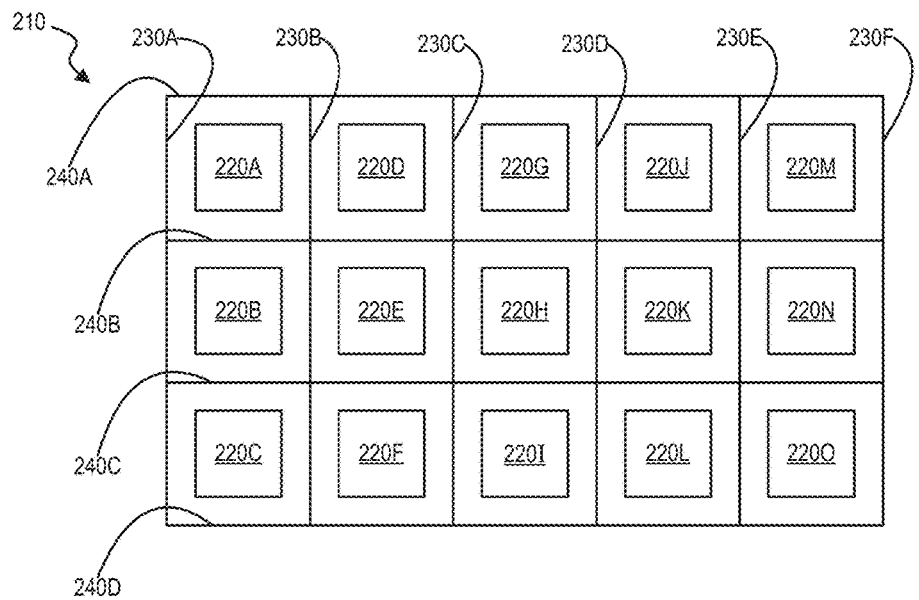
FIG. 2A illustrates an example of a portion of a display device, according to one or more embodiments.

Turning now to FIG. 2A, an example of a portion of a display device is illustrated, according to one or more embodiments. As shown, a display portion 210 may include pixels 220A-220O. In one or more embodiments, pixel 220 may be or include a physical point in an image displayed by display device 190. For example, pixel 220 may be or include a smallest controllable element of an image represented via display device 190. For instance, display device 190 may convey information via pixels 220. In one or more embodiments, display device 190 may emit light via pixels 220. For example, display device 190 may emit different colors of light via pixels 220. In one instance, pixel 220 may emit a single color. In another instance, pixel 220 may emit light at an intensity.

As shown, display portion 210 may include louvers 230A-230D and 240A-240D. In one or more embodiments, each of louver 230 and louver 240 may be or include a strip that has a height. Although not specifically illustrated, one or more of louvers 230 and 240 may extend into another display portion, according to one or more embodiments.

In one or more embodiments, one or more of louver 230 and louver 240 may include non-cubic crystal structures. In one example, the non-cubic crystal structures may restrict light emissions of display device 190. For instance, the non-cubic crystal structures may be utilized in absorbing and/or diffusing at least a portion of light emissions of display device 190. In another example, one or more of louver 230 and louver 240 may include liquid crystals. For instance, the liquid crystals may be utilized in absorbing and/or diffusing at least a portion of light emissions of display device 190.

In one or more embodiments, one or more of louver 230 and louver 240 may include PDLC. For example, the PDLC of a louver may restrict light emissions of display device 190. In one or more embodiments, when no voltage (e.g., zero voltage) is applied to the PDLC of one or more of louver 230 and louver 240, the liquid crystals of the PDLC may be randomly arranged, which may scatter light emissions of display device 190. For example, the PDLC of one or more of louver 230 and louver 240 may absorb and/or diffuse at least a portion of light emissions of display device 190. In one or more embodiments, one or more voltages, greater than a zero voltage, may be applied to one or more of louver 230 and louver 240. For example, when applying the one or more voltages, greater than a zero voltage, to one or more of louver 230 and louver 240, an electrical current may pass through the PDLC, which may align crystals of the PDLC along parallel axes that may permit light emissions of display device 190 to pass through. For instance, one or more degrees of transparency of light emissions of display device 190 may be associated with respective the one or more applied voltages to one or more of louver 230 and louver 240. In one or more embodiments, lower voltages applied to one or more of louver 230 and louver 240 may align a few liquid crystals of the PDLC, which may permit a small portion of light emissions of display device 190. In one or more embodiments, as voltages applied to one or more of louver 230 and louver 240 increase, fewer of the liquid crystals of the PDLC may be out of alignment, which may permit an increase in permitted light emissions of display device 190. For example, one or more voltages applied to one or more of louver 230 and louver 240 may be utilized to control one or more amounts of light emissions of display device 190.

Figure 2B:
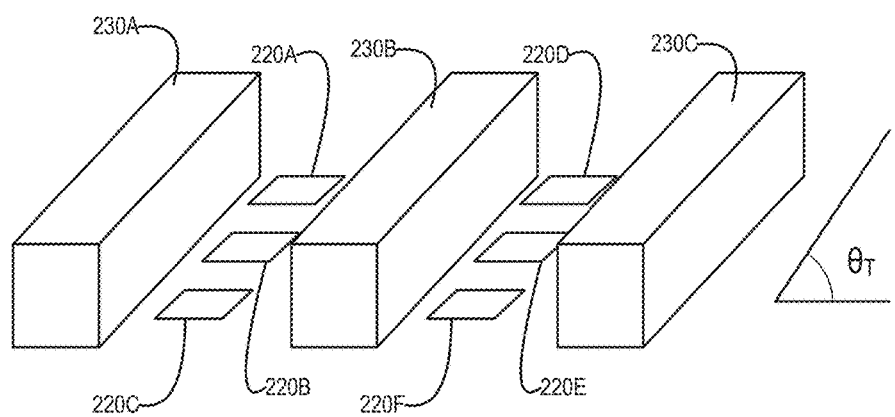
FIG. 2B illustrates an example of louvers of a display device, according to one or more embodiments.

Turning now to FIG. 2B, an example of louvers of a display device is illustrated, according to one or more embodiments. As shown, louvers 230A and 230B may have a height. In one or more embodiments, louvers 230A and 230B may have a height above pixels 220A-220C. As illustrated, louver 230C may have a height. In one or more embodiments, louvers 230B and 230C may have a height above pixels 220D-220F.

In one or more embodiments, a threshold angle may be associated with louvers 230 when louvers 230 absorb and/or diffuse at least a portion of light emissions of display device 190. For example, at least a portion of light emissions of display device 190 may be absorbed and/or diffused by louvers 230 when a viewing angle is less than the threshold angle $\theta_T$ or greater than $180-\theta_T$. In one instance, information conveyed via pixels 220 may not be decipherable by a person when louvers 230 absorb and/or diffuse at least a portion of light emissions of display device 190 and a viewing angle is less than the threshold angle $\theta_T$ or greater than $180-\theta_T$. In another instance, information conveyed via pixels 220 may be decipherable by a person when a viewing angle is greater than the threshold angle $\theta_T$ and less than $180-\theta_T$.

Figure 2C:
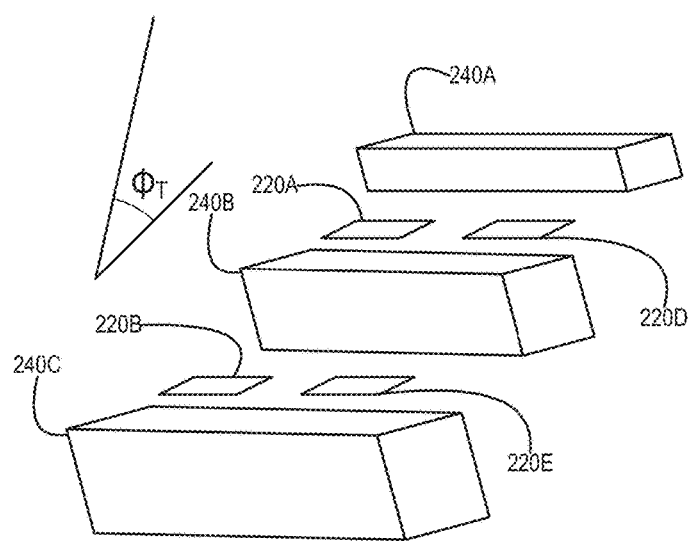
FIG. 2C illustrates another example of louvers of a display device, according to one or more embodiments.

Turning now to FIG. 2C, another example of louvers of a display device is illustrated, according to one or more embodiments. As shown, louvers 240A and 240B may have a height. In one or more embodiments, louvers 240A and 240B may have a height above pixels 220A and 220D. As illustrated, louver 240C may have a height. In one or more embodiments, louvers 240B and 240C may have a height above pixels 220B and 220E.

In one or more embodiments, a threshold angle may be associated with louvers 240 when louvers 240 absorb and/or diffuse at least a portion of light emissions of display device 190. For example, at least a portion of light emissions of display device 190 may be absorbed and/or diffused by louvers 240 when a viewing angle is less than the threshold angle $\phi_T$ or greater than $180-\phi_T$. In one instance, information conveyed via pixels 220 may not be decipherable by a person when louvers 240 absorb and/or diffuse at least a portion of light emissions of display device 190 and a viewing angle is less than the threshold angle $\phi_T$ or greater than $180-\phi_T$. In another instance, information conveyed via pixels 220 may be decipherable by a person when a viewing angle is greater than the threshold angle $\phi_T$ and less than $180-\phi_T$.

In one or more embodiments, louvers 230 and louvers 240 may be stacked. In one example, louvers 230 may be stacked on louvers 240. In another example, louvers 240 may be stacked on louvers 230. In one or more embodiments, louvers 230 and louvers 240 may form an anisotropic material. In one or more embodiments, an anisotropic material may include louvers 230 and louvers 240. In one or more embodiments, a filter may include louvers 230 and louvers 240. In one example, the filter may obscure and/or block information, via light emissions of a display device, at one or more viewing angles. In another example, the filter may permit and/or allow information, via light emissions of a display device, at one or more viewing angles.

Figure 2D:
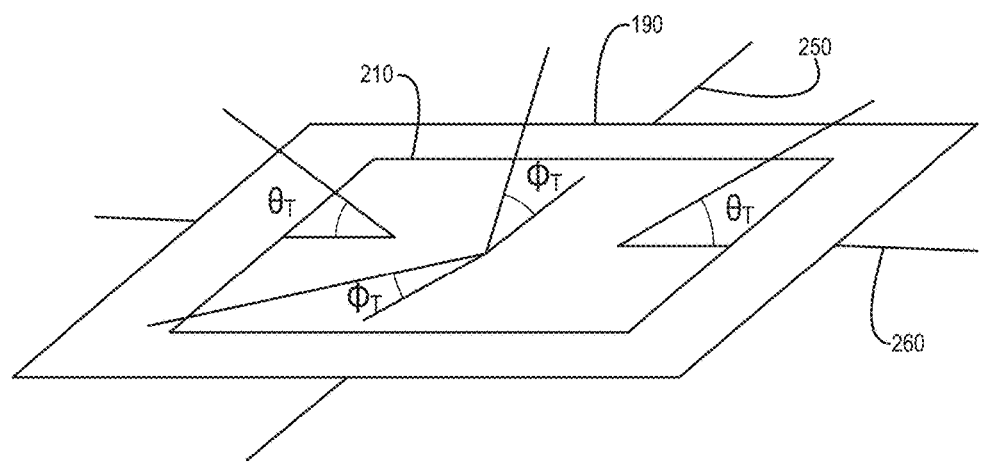
FIG. 2D illustrates an example of threshold angles of a display device, according to one or more embodiments.

Turning now to FIG. 2D, an example of threshold angles of a display device is illustrated, according to one or more embodiments. As shown, display device 190 may include display portion 210. In one or more embodiments, display device 190 may include other display portions 210. For example, display portion 210 may be for example and/or for illustrative purposes and may not actually exist within display device 190. As illustrated, the threshold angle $\phi_T$ or may be with reference to an axis 250, and the threshold angle $\theta_T$ may be with reference to an axis 260.

Figure 2E:
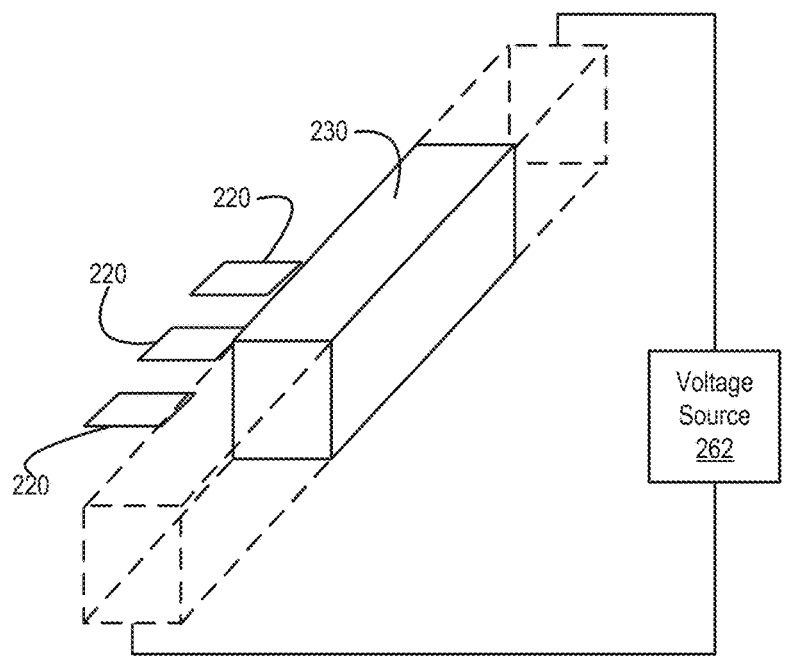
FIGS. 2E and 2F illustrate examples of voltage sources applied to louvers, according to one or more embodiments.
Figure 2F:
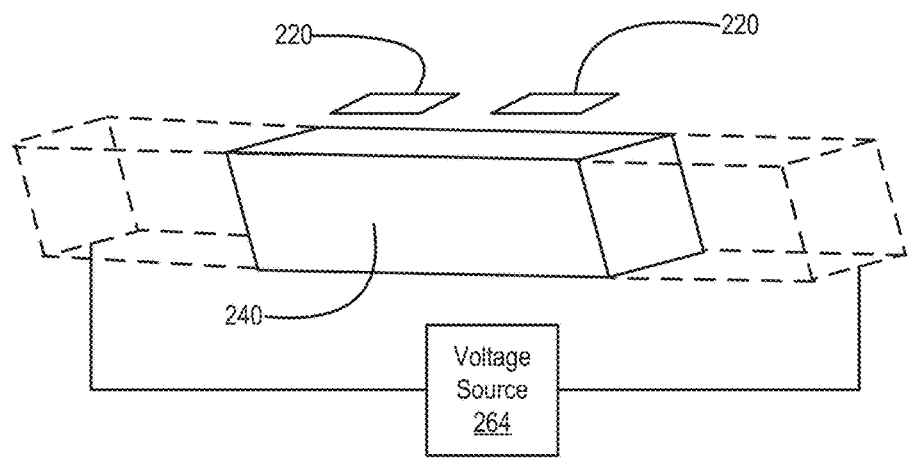

Turning now to FIGS. 2E and 2F, examples of voltage sources applied to louvers are illustrated, according to one or more embodiments. As shown in FIG. 2E, a voltage source 262 may apply a voltage to louver 230. The dashed sections of louver 230 indicate that louver 230 may be of any length. In one or more embodiments, voltage source 262 may apply a voltage to multiple louvers 230. For example, applying a voltage to multiple louvers 230 may actuate and/or engage louvers 230 such that louvers 230 may absorb, diffuse, and/or obscure at least a portion of light emissions of display device 190 and a viewing angle is less than the threshold angle $\theta_T$ or greater than $180-\theta_T$ with respect to axis 260. For instance, a person may not be able to decipher information conveyed from display device 190 when a viewing angle is less than the threshold angle $\theta_T$ or greater than $180-\theta_T$ with respect to axis 260 when a voltage from voltage source 262 is applied to louvers 230. In another example, information conveyed via pixels 220 may be decipherable by a person when a viewing angle is greater than the threshold angle $\theta_T$ and less than $180-\theta_T$ with respect to axis 260 when a voltage is not applied to louvers 230.

As illustrated in FIG. 2F, a voltage source 264 may apply a voltage to louver 240. The dashed sections of louver 230 indicate that louver 240 may be of any length. In one or more embodiments, voltage source 264 may apply a voltage to multiple louvers 240. In one example, applying a voltage to multiple louvers 240 may actuate and/or engage louvers 240 such that louvers 240 may absorb, diffuse, and/or obscure at least a portion of light emissions of display device 190 and a viewing angle is less than the threshold angle $\phi_T$ or greater than $180-\phi_T$ with respect to axis 250. For instance, a person may not be able to decipher information conveyed from display device 190 when a viewing angle is less than the threshold angle $\phi_T$ or greater than $180-\phi_T$ with respect to axis 250 when a voltage from voltage source 264 is applied to louvers 240. In another example, information conveyed via pixels 220 may be decipherable by a person when a viewing angle is greater than the threshold angle $\phi_T$ and less than $180-\phi_T$ with respect to axis 250 when a voltage is not applied to louvers 240. In one or more embodiments, one or more of voltage sources 262 and 264 may be controlled via one or more of processor 120 and an embedded controller 410 (described further below), among others.

Figure 2G:
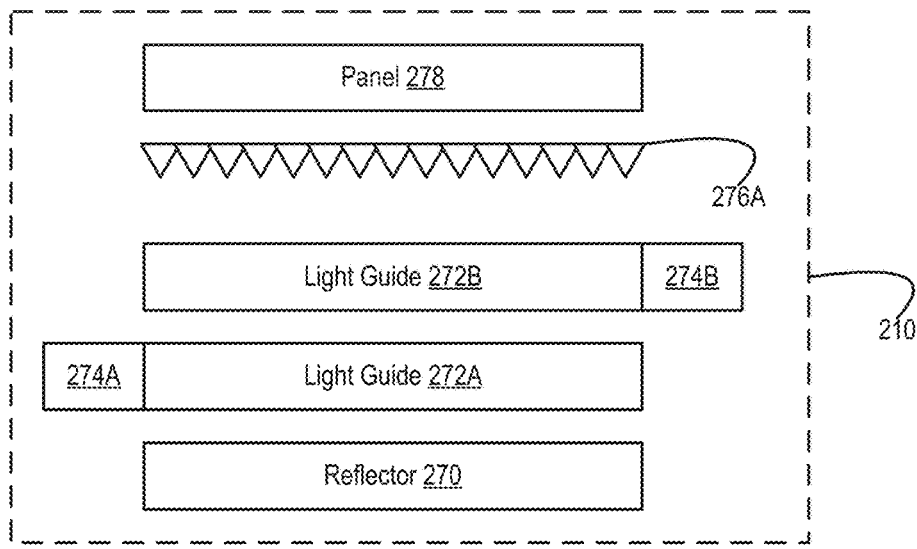
FIGS. 2G and 2H illustrate examples of turning films of a display device, according to one or more embodiments.
Figure 2H:
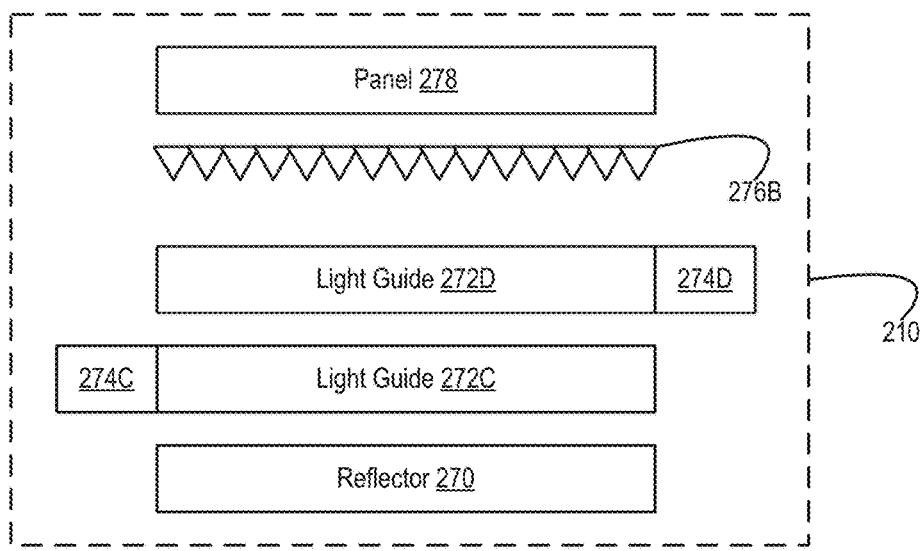

Turning now to FIGS. 2G and 2H, examples of turning films of a display device are illustrated, according to one or more embodiments. As shown in FIG. 2G, display portion 210 may include a reflector 270, a light guide 272A, a light source 274A, a light guide 272B, a light source 274B, a turning film 276A, and a panel 278. As illustrated in FIG. 2H, display portion 210 may include reflector 270, a light guide 272C, a light source 274C, a light guide 272D, a light source 274D, a turning film 276B, and panel 278. In one or more embodiments, display portion 210 illustrated in FIG.

2G may be associated with axis 250. In one or more embodiments, display portion 210 illustrated in FIG. 2H may be associated with axis 260. In one or more embodiments, utilizing display portion 210 illustrated in FIGS. 2G and 2H may provide privacy along one or more of axes 250 and 260. In one or more embodiments, an anisotropic material may include one or more of light guide 272, light source 274, turning film 276, and panel 278, among others.

In one or more embodiments, a light guide 272 may transmit illumination provided by a light source 274. In one example, light source 274 may include one or more light emitting diodes (LEDs). In a second example, light source 274 may include one or more cold cathode fluorescent lights (CCFLs). In another example, light source 274 may include one or more incandescent light sources. In one or more embodiments, light sources 274 may be driven and/or illuminated, in a selective fashion, in producing variable and/or switchable distributions of light emissions. In one or more embodiments, turning film 276 may be optically transparent and may have a thickness. For example, turning film 276 may be associated with one or more attributes such as one or more of a low haze and a high clarity, among others. For instance, the one or more attributes of turning film 276 may reduce and/or eliminate undesirable scattering of incident light emissions. In one or more embodiments, turning film 276 may have a high index of refraction. For example, the index of refraction of turning film 276 may be one and one-half (1.5) or greater. In one or more embodiments, turning film 276 may be or include an asymmetric turning film. In one or more embodiments, panel 278 may include a liquid crystal display (LCD). In one or more embodiments, panel 278 may be or include a variable contrast panel.

Figure 2I:
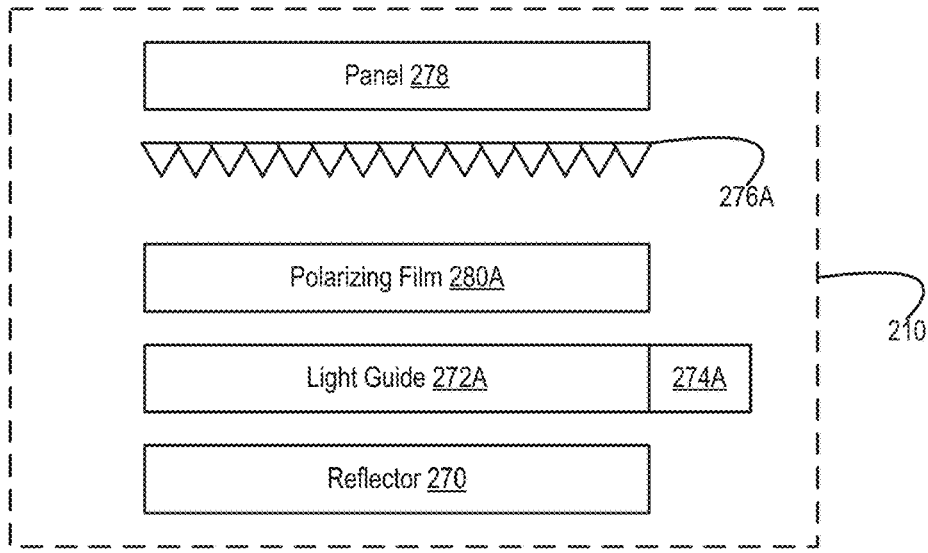
FIGS. 2I and 2J illustrate examples of turning films and polarizing films of a display device, according to one or more embodiments.
Figure 2J:
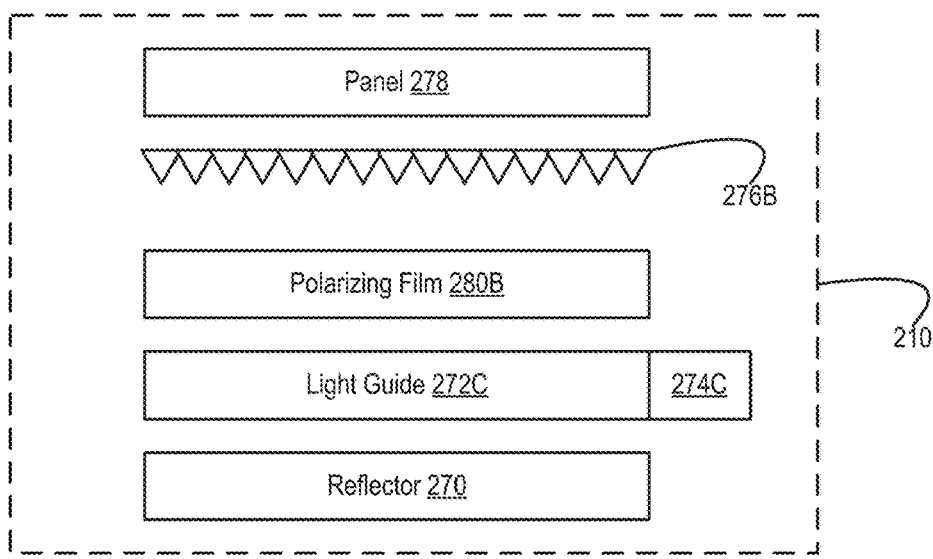

Turning now to FIGS. 2I and 2J, examples of turning films and polarizing films of a display device are illustrated, according to one or more embodiments. As shown in FIG. 2I, display portion 210 may include reflector 270, light guide 272A, light source 274A, a polarizing film 280A, turning film 276A, and panel 278. As illustrated in FIG. 2J, display portion 210 may include reflector 270, light guide 272C, light source 274C, a polarizing film 280B, turning film 276B, and panel 278. In one or more embodiments, display portion 210 illustrated in FIG. 2I may be associated with axis 250. In one or more embodiments, display portion 210 illustrated in FIG. 2J may be associated with axis 260. In one or more embodiments, utilizing display portion 210 illustrated in FIGS. 2I and 2J may provide privacy along one or more of axes 250 and 260. In one or more embodiments, an anisotropic material may include one or more of light guide 272, light source 274, turning film 276, polarizing film 280, and panel 278, among others.

Figure 2K:
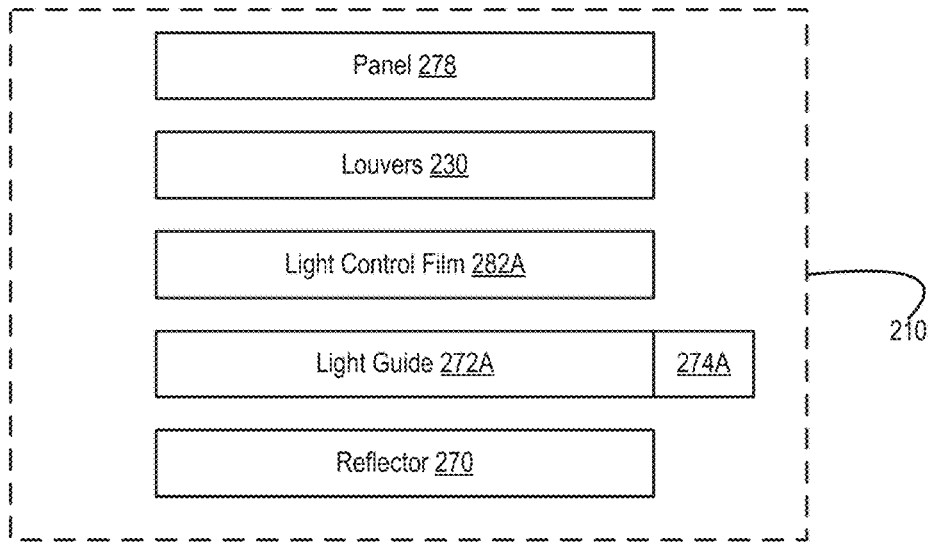
FIGS. 2K and 2L illustrate examples of light control films and louvers of a display device, according to one or more embodiments.
Figure 2L:
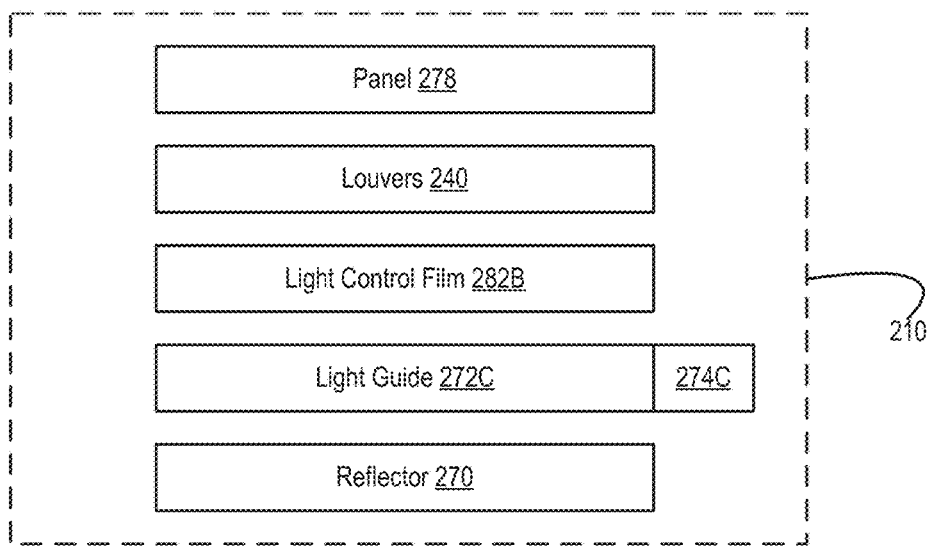

Turning now to FIGS. 2K and 2L, examples of light control films and louvers of a display device are illustrated, according to one or more embodiments. As shown in FIG. 2K, display portion 210 may include reflector 270, light guide 272A, light source 274A, a light control film 282A, louvers 230, and panel 278. As illustrated in FIG. 2L, display portion 210 may include reflector 270, light guide 272C, light source 274C, a light control film 282B, louvers 240, and panel 278. In one or more embodiments, display portion 210 illustrated in FIG. 2K may be associated with axis 250. In one or more embodiments, display portion 210 illustrated in FIG. 2L may be associated with axis 260. In one or more embodiments, utilizing display portion 210 illustrated in FIGS. 2K and 2L may provide privacy along one or more of axes 250 and 260. In one or more embodiments, an anisotropic material may include one or more of light guide 272, light source 274, turning film 276, light control film 282, louvers 230, louvers 240, and panel 278, among others.

Figure 3A:
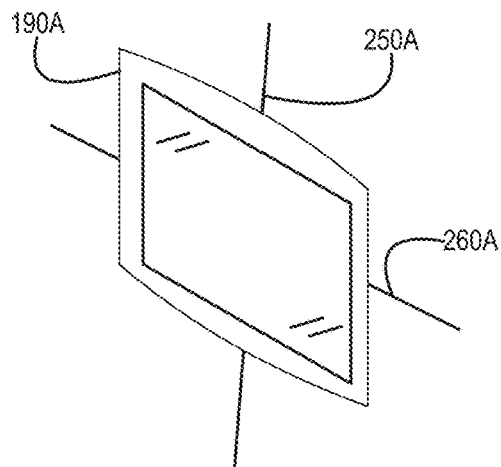
FIGS. 3A-3F illustrates example display devices, according to one or more embodiments.

Turning now to FIGS. 3A-3F, example display devices are illustrated, according to one or more embodiments. With reference to FIG. 3A, display device 190A may be in a landscape mode. In one example, louvers 230 may absorb, diffuse, and/or obscure at least a portion of light emissions of display device 190A when a viewing angle is less than the threshold angle $\theta_T$ or greater than $180-\theta_T$ with respect to axis 260A. For instance, a person may not be able to decipher information conveyed from display device 190A when a viewing angle is less than the threshold angle $\theta_T$ or greater than $180-\theta_T$ with respect to axis 260A. In another example, information conveyed via pixels 220 may be decipherable by a person when a viewing angle is greater than the threshold angle $\theta_T$ and less than $180-\theta_T$ with respect to axis 260A.

Figure 3B:
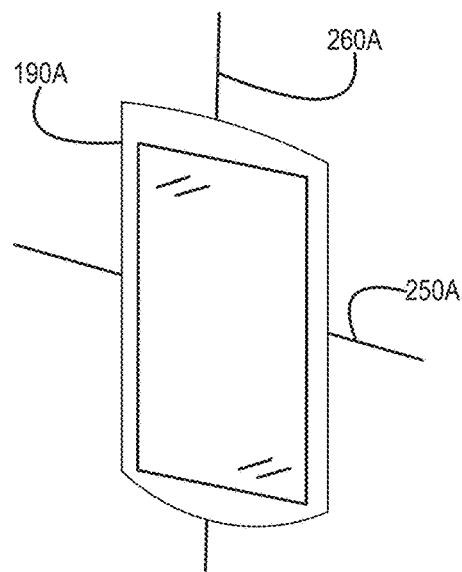

With reference to FIG. 3B, display device 190A may be in a portrait mode. In one example, louvers 240 may absorb, diffuse, and/or obscure at least a portion of light emissions of display device 190A when a viewing angle is less than the threshold angle $\phi_T$ or greater than $180-\phi_T$ with respect to axis 250A. For instance, a person may not be able to decipher information conveyed from display device 190A when a viewing angle is less than the threshold angle $\phi_T$ or greater than $180-\phi_T$ with respect to axis 250A. In another example, information conveyed via pixels 220 may be decipherable by a person when a viewing angle is greater than the threshold angle $\phi_T$ and less than $180-\phi_T$ with respect to axis 250A.

In one or more embodiments, with reference to either of FIGS. 3A and 3B, louvers 230 may absorb, diffuse, and/or obscure at least a portion of light emissions of display device 190A, and louvers 240 may absorb, diffuse, and/or obscure at least another portion of light emissions of display device 190A. For example, louvers 230 may absorb, diffuse, and/or obscure at least a portion of light emissions of display device 190A when a viewing angle is less than the threshold angle $\theta_T$ or greater than $180-\theta_T$ with respect to axis 260A, and louvers 240 may absorb, diffuse, and/or obscure at least another portion of light emissions of display device 190A when a viewing angle is less than the threshold angle $\phi_T$ or greater than $180-\phi_T$ with respect to axis 250A. For instance, a person may not be able to decipher information conveyed from display device 190A when a viewing angle is less than the threshold angle $\theta_T$ or greater than $180-\theta_T$ with respect to axis 260A and/or when a viewing angle is less than the threshold angle $\phi_T$ or greater than $180-\phi_T$ with respect to axis 250A.

Figure 3C:
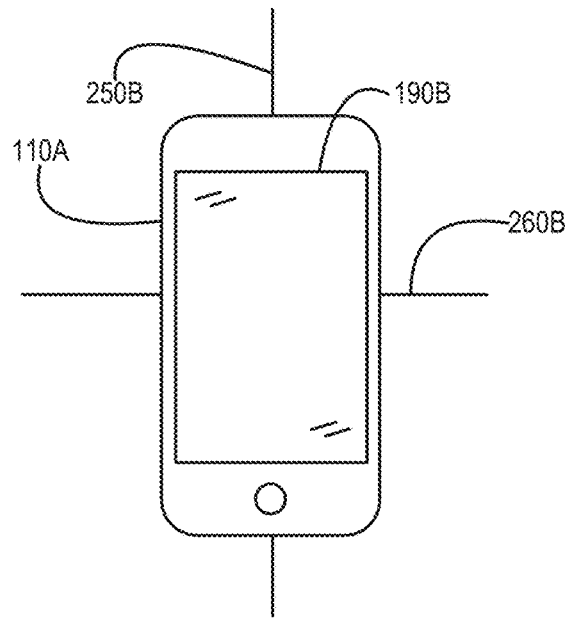

With reference to FIG. 3C, display device 190B may be in a portrait mode. In one or more embodiments, an IHS 110A (e.g., a tablet computing device) may include display device 190B. In one example, louvers 230 may absorb, diffuse, and/or obscure at least a portion of light emissions of display device 190B when a viewing angle is less than the threshold angle $\theta_T$ or greater than $180-\theta_T$ with respect to axis 260B. For instance, a person may not be able to decipher information conveyed from display device 190B when a viewing angle is less than the threshold angle $\theta_T$ or greater than $180-\theta_T$ with respect to axis 260B. In another example, information conveyed via pixels 220 may be decipherable by a person when a viewing angle is greater than the threshold angle $\theta_T$ and less than $180-\theta_T$ with respect to axis 260B.

Figure 3D:
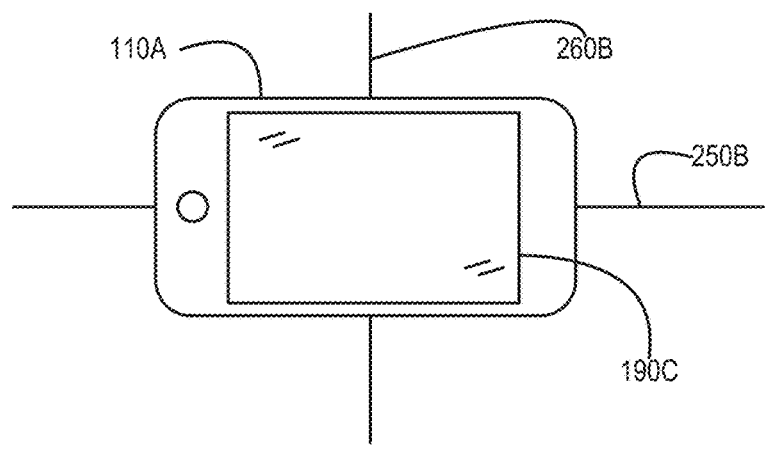

With reference to FIG. 3D, display device 190B may be in a landscape mode. In one example, louvers 240 may absorb, diffuse, and/or obscure at least a portion of light emissions of display device 190B when a viewing angle is less than the threshold angle $\phi_T$ or greater than 180-$\phi_T$ with respect to axis 250B. For instance, a person may not be able to decipher information conveyed from display device 190B when a viewing angle is less than the threshold angle $\phi_T$ or greater than 180-$\phi_T$ with respect to axis 250B. In another example, information conveyed via pixels 220 may be decipherable by a person when a viewing angle is greater than the threshold angle $\phi_T$ and less than 180$\phi_T$ with respect to axis 250B.

In one or more embodiments, with reference to either of FIGS. 3C and 3D, louvers 230 may absorb, diffuse, and/or obscure at least a portion of light emissions of display device 190B, and louvers 240 may absorb, diffuse, and/or obscure at least another portion of light emissions of display device 190B. For example, louvers 230 may absorb, diffuse, and/or obscure at least a portion of light emissions of display device 190B when a viewing angle is less than the threshold angle $\theta_T$ or greater than 180-$\theta_T$ with respect to axis 260B, and louvers 240 may absorb, diffuse, and/or obscure at least another portion of light emissions of display device 190B and a viewing angle is less than the threshold angle $\phi_T$ or greater than 180-$\phi_T$ with respect to axis 250B. For instance, a person may not be able to decipher information conveyed from display device 190B when a viewing angle is less than the threshold angle $\theta_T$ or greater than 180-$\theta_T$ with respect to axis 260B and/or when a viewing angle is less than the threshold angle $\phi_T$ or greater than 180-$\phi_T$ with respect to axis 250B.

Figure 3E:
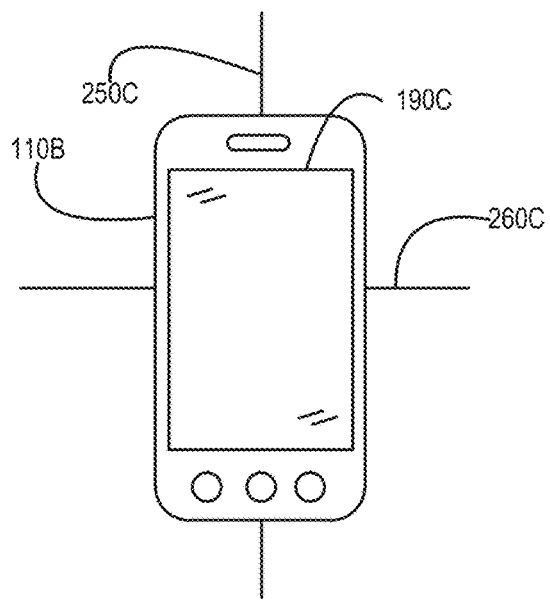

With reference to FIG. 3E, display device 190C may be in a portrait mode. In one or more embodiments, an IHS 110B (e.g., a wireless telephone, a smart phone, a PDA, a digital music player, etc.) may include display device 190C. In one example, louvers 230 may absorb, diffuse, and/or obscure at least a portion of light emissions of display device 190C when a viewing angle is less than the threshold angle $\theta_T$ or greater than 180-$\theta_T$ with respect to axis 260C. For instance, a person may not be able to decipher information conveyed from display device 190C when a viewing angle is less than the threshold angle $\theta_T$ or greater than 180-$\theta_T$ with respect to axis 260C. In another example, information conveyed via pixels 220 may be decipherable by a person when a viewing angle is greater than the threshold angle $\theta_T$ and less than 180-$\theta_T$ with respect to axis 260C.

Figure 3F:
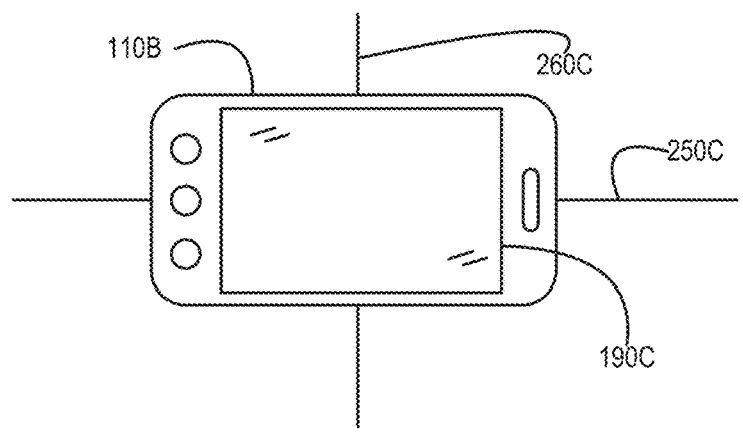

With reference to FIG. 3F, display device 190C may be in a landscape mode. In one example, louvers 240 may absorb, diffuse, and/or obscure at least a portion of light emissions of display device 190C when a viewing angle is less than the threshold angle $\phi_T$ or greater than 180-$\phi_T$ with respect to axis 250C. For instance, a person may not be able to decipher information conveyed from display device 190C when a viewing angle is less than the threshold angle $\phi_T$ or greater than 180-$\phi_T$ with respect to axis 250C. In another example, information conveyed via pixels 220 may be decipherable by a person when a viewing angle is greater than the threshold angle $\phi_T$ and less than 180-$\phi_T$ with respect to axis 250C.

In one or more embodiments, with reference to either of FIGS. 3E and 3F, louvers 230 may absorb, diffuse, and/or obscure at least a portion of light emissions of display device 190C, and louvers 240 may absorb, diffuse, and/or obscure at least another portion of light emissions of display device 190C. For example, louvers 230 may absorb, diffuse, and/or obscure at least a portion of light emissions of display device 190C when a viewing angle is less than the threshold angle $\theta_T$ or greater than 180-$\theta_T$ with respect to axis 260C, and louvers 240 may absorb, diffuse, and/or obscure at least another portion of light emissions of display device 190C when a viewing angle is less than the threshold angle $\phi_T$ or greater than 180-$\phi_T$ with respect to axis 250C. For instance, a person may not be able to decipher information conveyed from display device 190C when a viewing angle is less than the threshold angle $\theta_T$ or greater than 180-$\theta_T$ with respect to axis 260C and/or when a viewing angle is less than the threshold angle $\phi_T$ or greater than 180-$\phi_T$ with respect to axis 250C.

Figure 4:
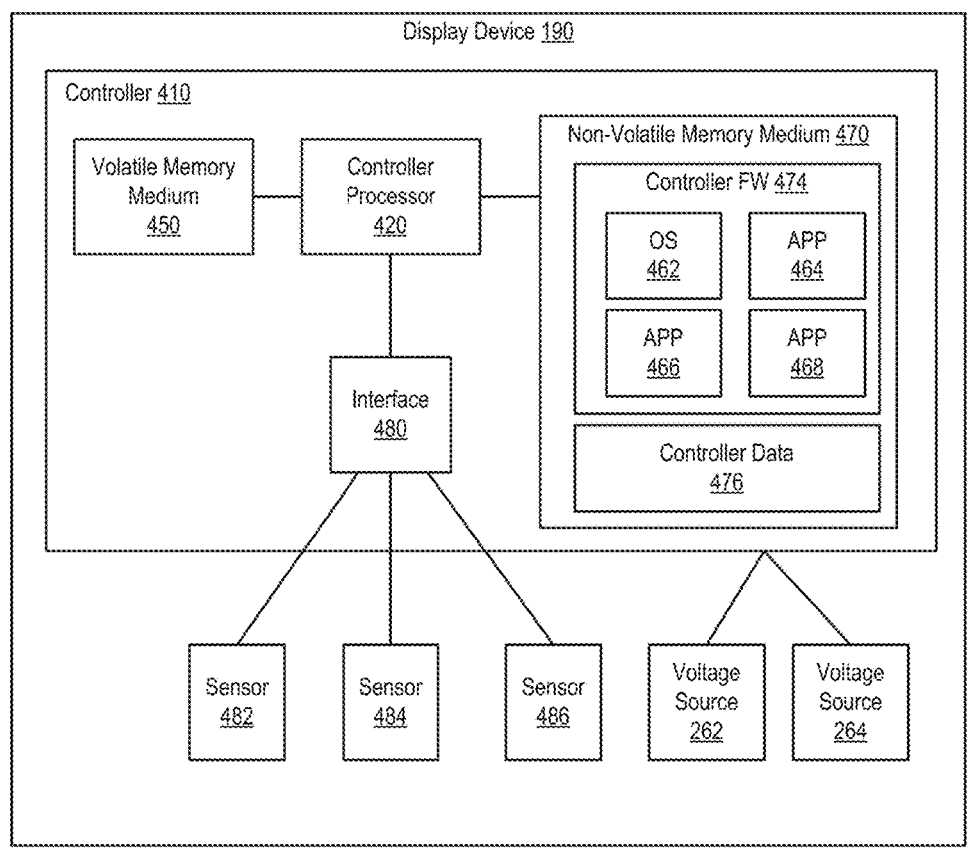
FIG. 4 illustrates an example of an embedded controller and sensors, according to one or more embodiments.

Turning now to FIG. 4, an example of a controller and sensors is illustrated, according to one or more embodiments. As shown, a controller may include a controller processor 420, a volatile memory medium 450, a non-volatile memory medium 470, and an interface 480. As illustrated, non-volatile memory medium 474 may include an controller FW 474, which may include an OS 462 and APPs 464-468, and may include controller data 476. For example, OS 462 may be or include a real time operating system (RTOS).

In one or more embodiments, one or more of OS 462 and APPs 464-468 may include processor instructions executable by controller processor 420. In one example, controller processor 420 may execute processor instructions of one or more of OS 462 and APPs 464-468 via non-volatile memory medium 470. In another example, one or more portions of the processor instructions of the one or more of OS 462 and APPs 464-468 may be transferred to volatile memory medium 450, and controller processor 420 may execute the one or more portions of the processor instructions of the one or more of OS 462 and APPs 464-468 via volatile memory medium 450.

In one or more embodiments, controller processor 420 may utilize controller data 476. In one example, controller processor 420 may utilize controller data 476 via non-volatile memory medium 470. In another example, one or more portions of controller data 476 may be transferred to volatile memory medium 450, and controller processor 420 may utilize controller data 476 via volatile memory medium 450.

As illustrated, display device 190 may include controller 410 and one or more of sensors 482-486. In one or more embodiments, one or more of sensors 482-486 may be coupled to controller 410. For example, one or more of sensors 482-486 may be coupled to an interface 480 of controller 410. In one or more embodiments, interface 480 may be or include a sensor hub. In one or more embodiments, interface 480 may include one or more of an I²C interface, a SPI interface, a USB interface, a general purpose input/output (GPIO) interface, and a universal asynchronous receiver-transmitter (UART) interface, among others. In one or more embodiments, sensors 482-486 may include one or more structures and/or functionalities as those described with reference to respective sensors 182-186. For example, controller processor 420 may receive data from one or more of sensors 482-486. For instance, controller processor 420 may receive data from one or more of sensors 482-486 via interface 480.

In one or more embodiments, controller 410 may be coupled to IHS 110. For example, controller 410 may receive and/or provide information from and/or to IHS 110. In one or more embodiments, controller 410 may control louvers 230 and 240 based on information received from one or more of sensors 482-486 and IHS 110. As shown, voltage sources 262 and 264 may be coupled to controller 410. In one or more embodiments, one or more of controller 410 and controller 420 may control one or more of voltage sources 262 and 264. In one or more embodiments, one or more of IHS 110 and processor 120 may control one or more of voltage sources 262 and 264 via one or more of controller 410 and controller 420.

Figure 5:
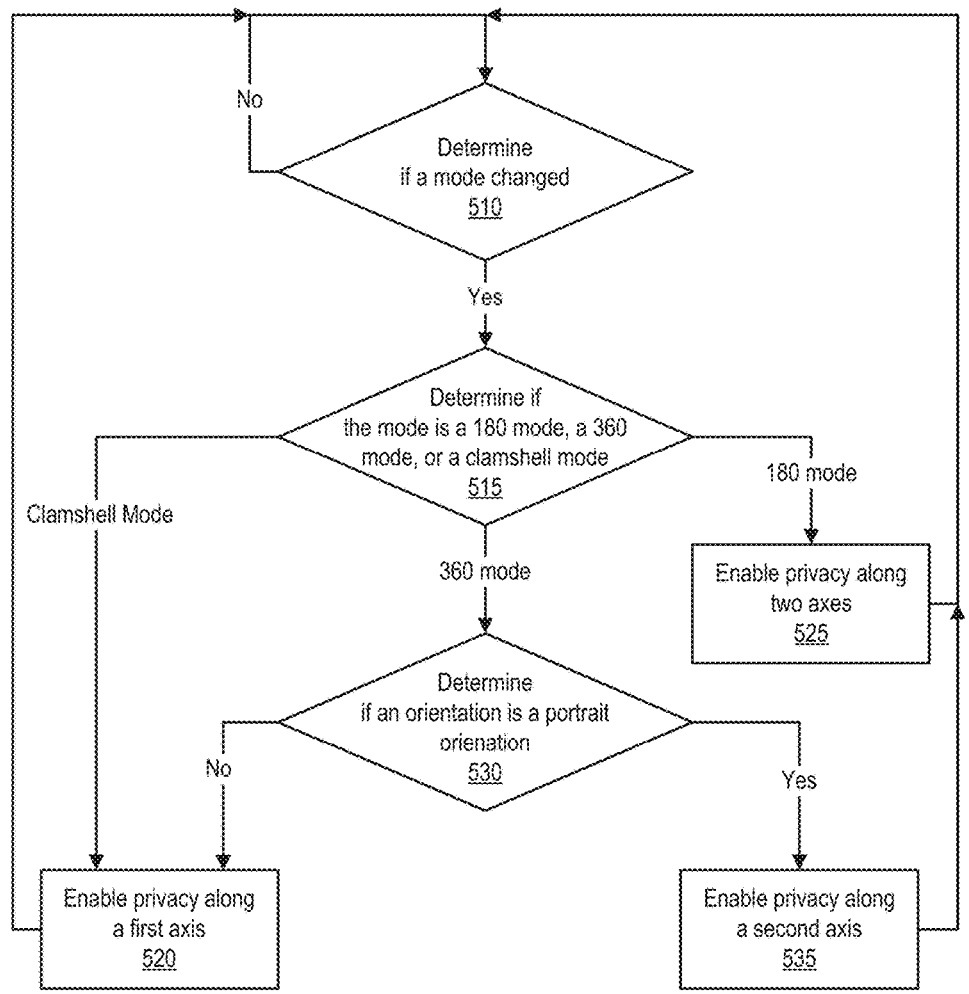
FIG. 5 illustrates an example of a method of enabling privacy of a display device, according to one or more embodiments.
Figure 6A:
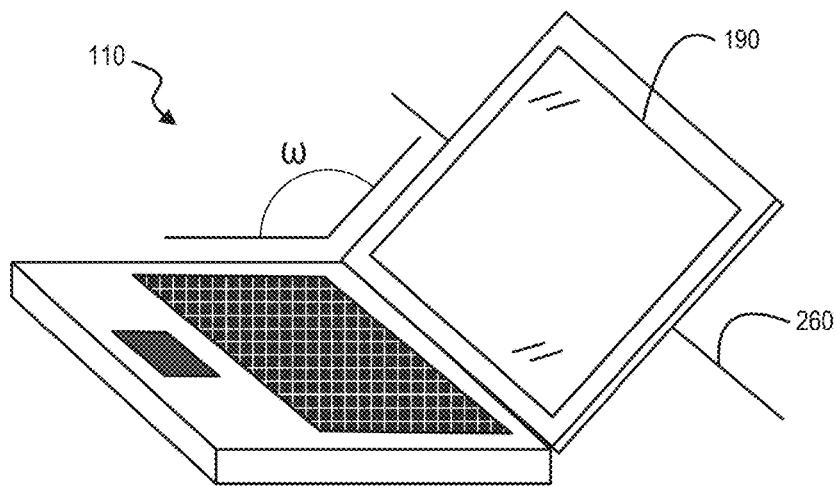
FIG. 6A illustrates an example of an information handling system in a clamshell mode, according to one or more embodiments.

Turning now to FIG. 5, an example of a method of enabling privacy of a display device is illustrated, according to one or more embodiments. At 510, it may be determined if a mode has changed. For example, IHS 110 may determine if a mode has changed. In one instance, processor 120 may receive an interrupt that indicates the mode change. In another instance, IHS 110 may receive user input that indicates the mode change. If the mode has not changed, the method may return to 510, according to one or more embodiments. If the mode has changed, it may be determined if the mode is a "180 mode", a "360 mode", or a "clamshell mode", at 515. If the mode is the mode is the clamshell mode, privacy along a first axis may be enabled, at 520. For example, FIG. 6A illustrates IHS 110 in the clamshell mode, and privacy along axis 260 may be enabled. In one or more embodiments, the method may proceed to 510. In one or more embodiments, the user input may be received via a software interface of IHS 110. For example, the user input may be received via a graphical user interface of IHS 110. In one or more embodiments, the user input may be received via a physical switch of IHS 110. For example, the user input may be received via a physical push button of IHS 110.

Figure 6B:
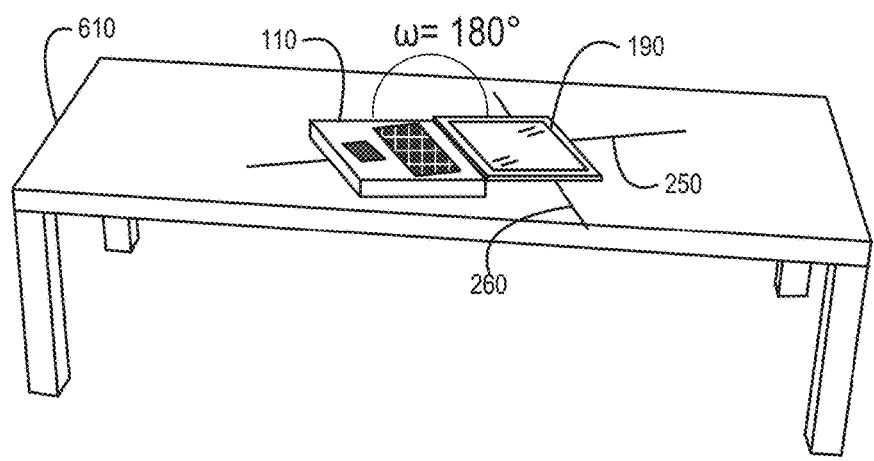
FIG. 6B illustrates an example of an information handling system lying on a surface, according to one or more embodiments.
Figure 6C:
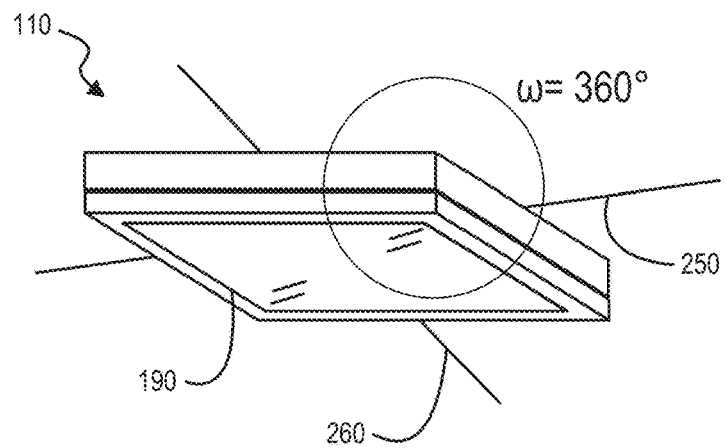
FIGS. 6C and 6D illustrates examples of an information handling system in a 360 mode, according to one or more embodiments.
Figure 6D:
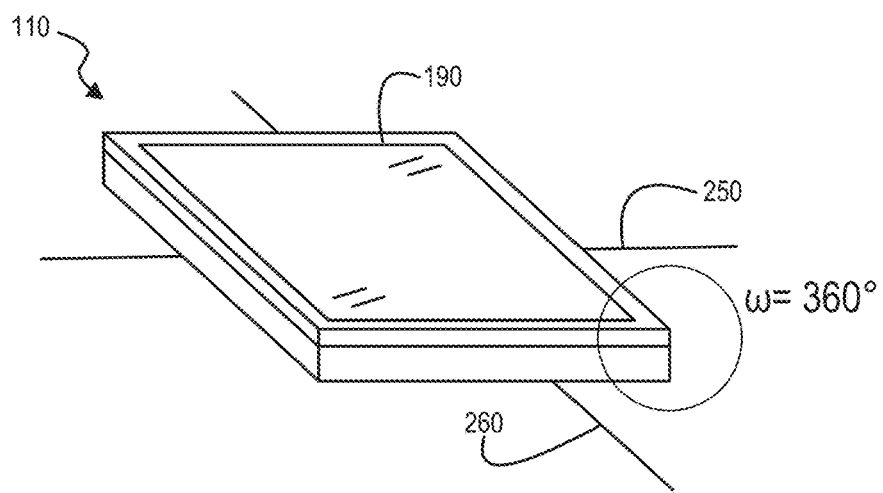

If the mode is the 180 mode, privacy along two axes may be enabled, at 525. For example, FIG. 6B illustrates IHS 110 in the 180 mode, and privacy along axes 250 and 260 may be enabled. In one instance, IHS 110 may be lying flat on a table 610. In another instance, IHS 110 may be lying substantially flat on a hand or lap of a person. In one or more embodiments, the method may proceed to 510. If the mode is the 360 mode, it may be determined if an orientation of display device 190 is a portrait orientation, at 530. If the orientation is not the portrait orientation, privacy along the first axis may be enabled, at 520. In one example, FIG. 6C illustrates an example of IHS 110 in a 360 mode. In another example, FIG. 6D illustrates another example of IHS 110 in a 360 mode. In one or more embodiments, the method may proceed to 510. If the orientation is the portrait orientation, privacy along a second axis may be enabled, at 535.

Figure 7:
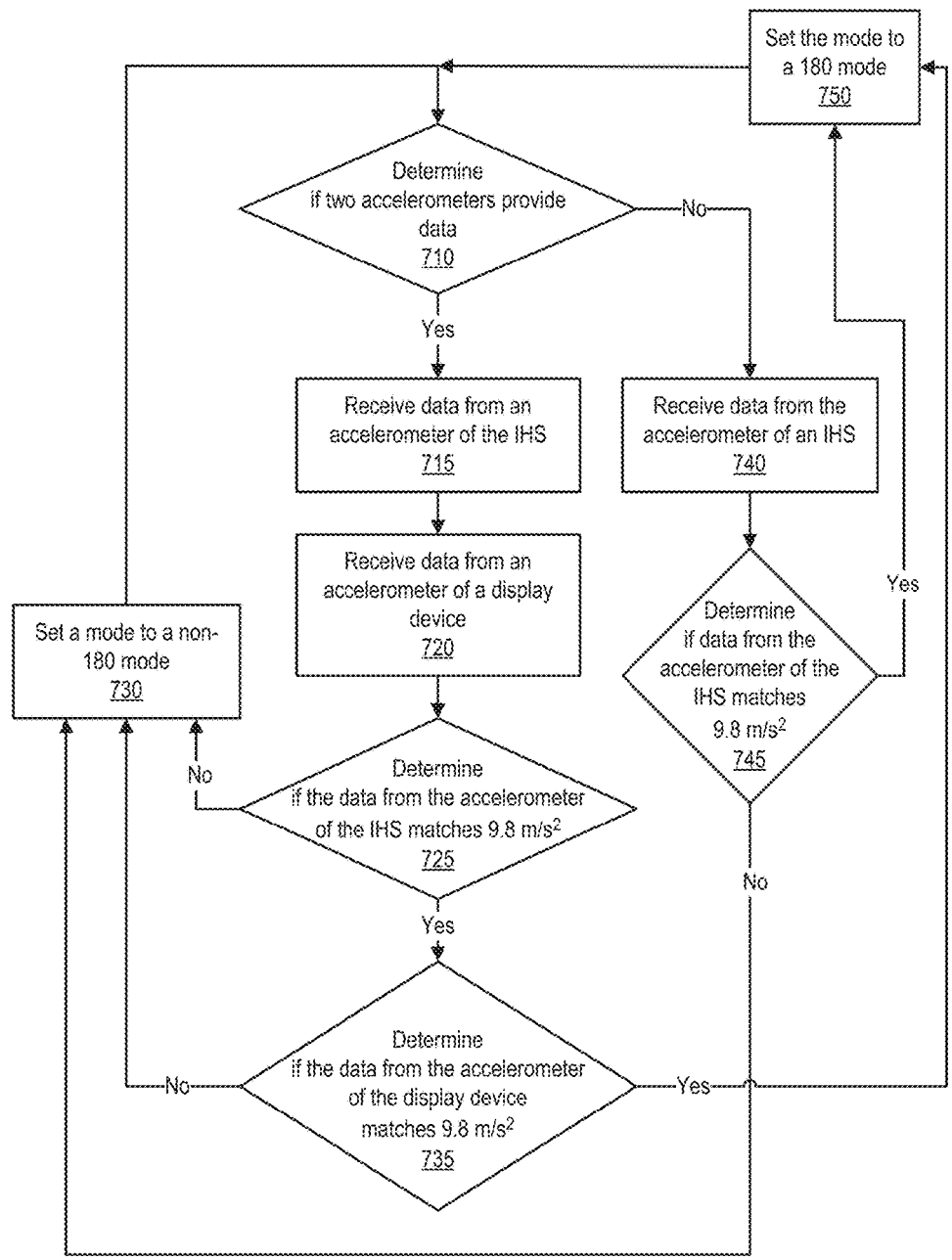
FIG. 7 illustrates an example of a method of determining a 180 mode, according to one or more embodiments.

Turning now to FIG. 7, an example of a method of determining a 180 mode is illustrated, according to one or more embodiments. At 710, it may be determined if two accelerometers provide data. In one or more embodiments, determining if two accelerometers provide data may include determining if two accelerometers are present. In one or more embodiments, determining if two accelerometers provide data may include determining if two accelerometers are communicatively coupled to processor 120. If the two accelerometers provide data, data from an accelerometer of IHS 110 may be received, at 715. For example, processor 120 may receive data from sensor 182 (e.g., an accelerometer) may be received. At 720, data from an accelerometer of a display device may be received. For example, processor 120 may receive data from sensor 482 (e.g., an accelerometer). For instance, processor 120 may receive data from sensor 482 may be received via controller processor 420.

At 725, it may be determined if the data from the accelerometer of IHS 110 matches 9.8 m/s². For example, determining if the data from the accelerometer of IHS 110 matches 9.8 m/s² may include determining if the data from the accelerometer of IHS 110 matches a typical acceleration of gravity. In one or more embodiments, determining a match may include determining if data is within a tolerance. For example, the tolerance may include plus or minus five percent (5%). If the data from the accelerometer of IHS 110 does not match 9.8 m/s², a mode of non-180 mode may be set, at 730. In one or more embodiments, the method may proceed to 710. If the data from the accelerometer of IHS 110 matches 9.8 m/s², it may be determined if the data from the accelerometer of display device 190 matches 9.8 m/s², at 735. For example, determining if the data from the accelerometer of display device 190 matches 9.8 m/s² may include determining if the data from the accelerometer of display device 190 matches a typical acceleration of gravity. In one or more embodiments, determining a match may include determining if data is within a tolerance. For example, the tolerance may include plus or minus five percent (5%).

If the data from the accelerometer of display device 190 does not match 9.8 m/s², the mode of non-180 mode may be set, at 730. In one or more embodiments, the method may proceed to 710. If the data from the accelerometer of display device 190 matches 9.8 m/s², the mode may be set to the 180 mode, at 750. In one or more embodiments, the method may proceed to 710. If two accelerometers do not provide data, data from the accelerometer of IHS 110 may be received, at 740. For example, processor 120 may receive data from sensor 182 (e.g., an accelerometer) may be received.

At 745, it may be determined if the data from the accelerometer of IHS 110 matches 9.8 m/s². For example, determining if the data from the accelerometer of IHS 110 matches 9.8 m/s² may include determining if the data from the accelerometer of IHS 110 matches a typical acceleration of gravity. In one or more embodiments, determining a match may include determining if data is within a tolerance. For example, the tolerance may include plus or minus five percent (5%). If the data from the accelerometer of IHS 110 does not match 9.8 m/s², a mode of non-180 mode may be set, at 730. In one or more embodiments, the method may proceed to 710. If the data from the accelerometer of IHS 110 matches 9.8 m/s², the mode may be set to the 180 mode, at 750. In one or more embodiments, the method may proceed to 710.

Figure 8:
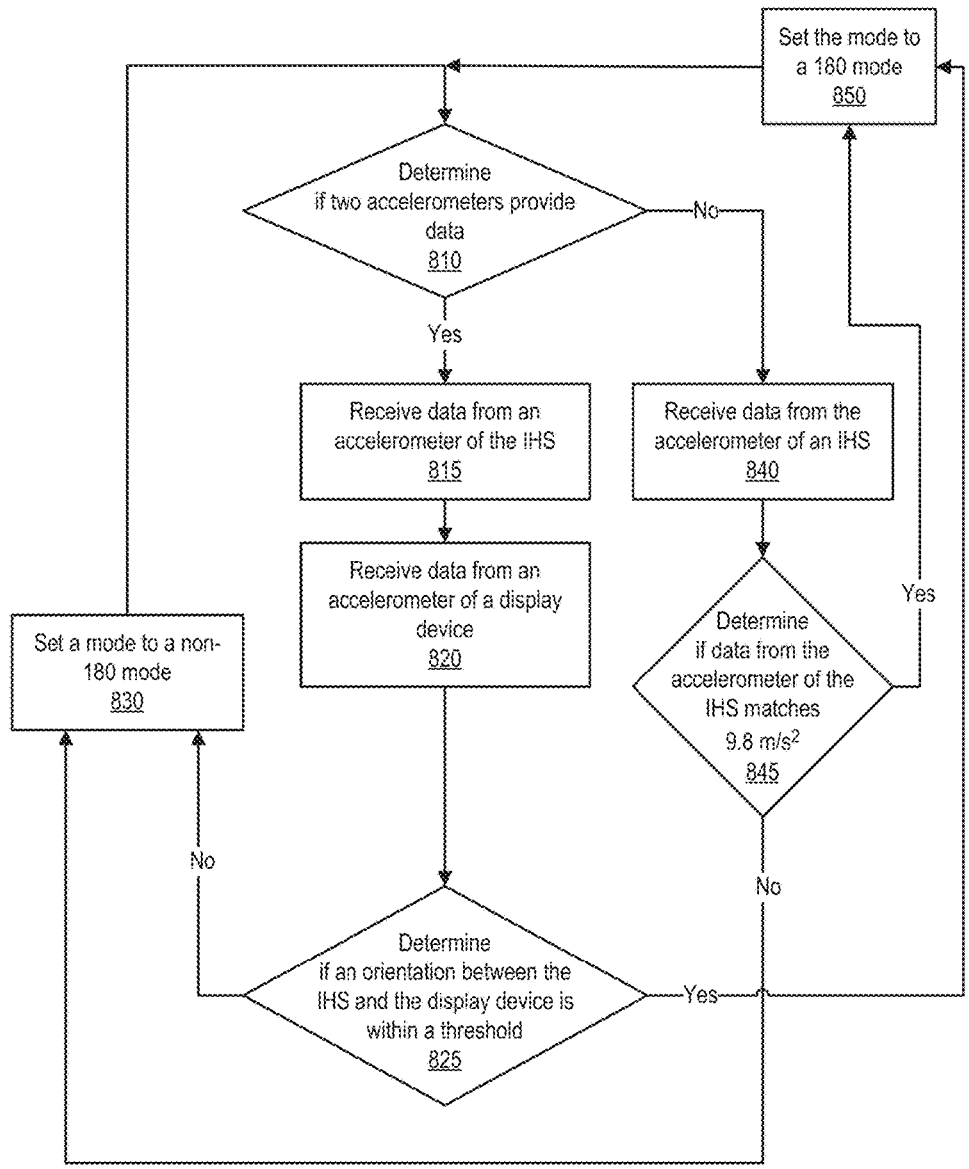
FIG. 8 illustrates an example of a method of utilizing vectors in determining a 180 mode, according to one or more embodiments.

Turning now to FIG. 8, an example of a method of utilizing vectors in determining a 180 mode is illustrated, according to one or more embodiments. At 810, it may be determined if two accelerometers provide data. In one or more embodiments, determining if two accelerometers provide data may include determining if two accelerometers are present. In one or more embodiments, determining if two accelerometers provide data may include determining if two accelerometers are communicatively coupled to processor 120. If the two accelerometers provide data, data from an accelerometer of IHS 110 may be received, at 815. For example, processor 120 may receive data from sensor 182 (e.g., an accelerometer) may be received. At 820, data from an accelerometer of a display device may be received. For example, processor 120 may receive data from sensor 482 (e.g., an accelerometer). For instance, processor 120 may receive data from sensor 482 may be received via controller processor 420.

At 825, it may be determined if an orientation between IHS 110 and display 190 is within a threshold. For example, the orientation between IHS 110 and display 190 may be represented by an angle ω, illustrated in FIG. 6A. In one or more embodiments, determining if the orientation between IHS 110 and display 190 is within the threshold may include utilizing the data from the accelerometer of IHS 110 as a first vector and utilizing the data from the accelerometer of display device 190 as a second vector. For example, determining if the orientation between IHS 110 and display 190 is within the threshold may include determining if an angle between the first vector and the second vector is less than or equal to a threshold angle. For instance, determining if an angle, ω, between the first vector and the second vector is less than or equal to a threshold angle, $\omega_{Threshold}$, may include determining:

$$\omega = \cos^{-1}\left(\frac{\vec{X_1} \cdot \vec{X_2}}{\|\vec{X_1}\| \cdot \|\vec{X_2}\|}\right) \leq \omega_{Threshold}$$

If the orientation between IHS 110 and display 190 is not within the threshold (e.g., ω is not less than or equal to $\omega_{Threshold}$), a mode of a non-180 mode may be set, at 830. If the orientation between IHS 110 and display 190 is within the threshold (e.g., ω is less than or equal to $\omega_{Threshold}$), a mode of a 180 mode may be set, at 850. In one or more embodiments, the method may proceed to 810. If two accelerometers do not provide data, data from the accelerometer of IHS 110 may be received, at 840. For example, processor 120 may receive data from sensor 182 (e.g., an accelerometer) may be received.

At 845, it may be determined if the data from the accelerometer of IHS 110 matches 9.8 m/s². For example, determining if the data from the accelerometer of IHS 110 matches 9.8 m/s² may include determining if the data from the accelerometer of IHS 110 matches a typical acceleration of gravity. In one or more embodiments, determining a match may include determining if data is within a tolerance. For example, the tolerance may include plus or minus five percent (5%). If the data from the accelerometer of IHS 110 does not match 9.8 m/s², a mode of non-180 mode may be set, at 830. In one or more embodiments, the method may proceed to 810. If the data from the accelerometer of IHS 110 matches 9.8 m/s², the mode may be set to the 180 mode, at 850. In one or more embodiments, the method may proceed to 810.

Figure 9:
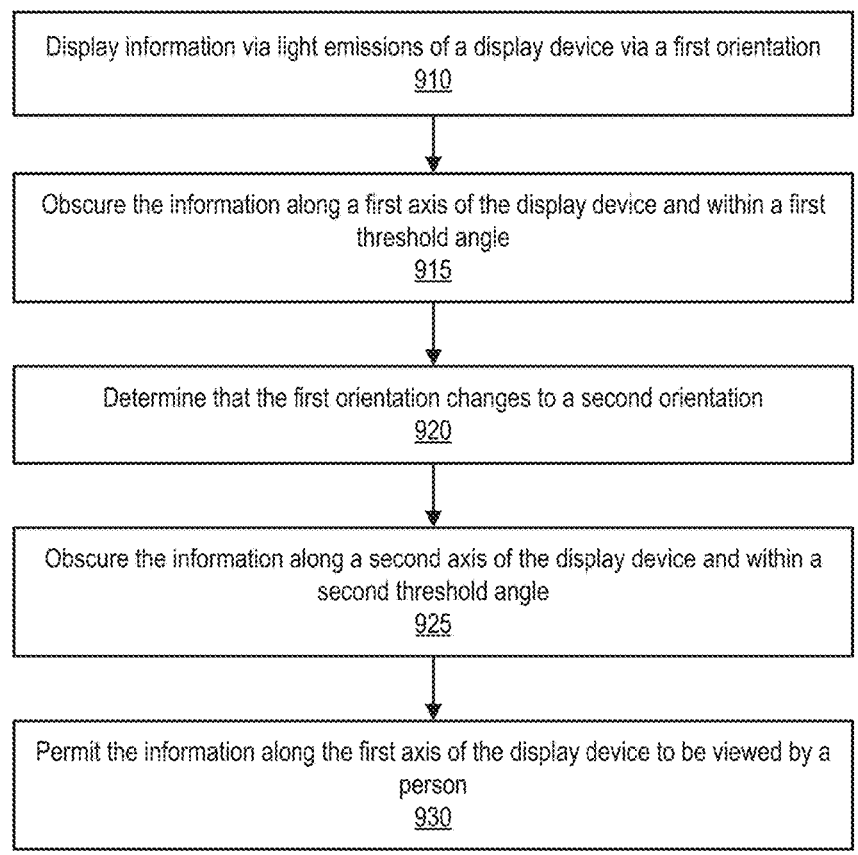
FIG. 9 illustrates an example of a method of controlling light emissions of a display device, according to one or more embodiments.

Turning now to FIG. 9, an example of a method of controlling light emissions of a display device is illustrated, according to one or more embodiments. At 910, information may be displayed via light emissions of a display device via a first orientation. In one example, display device 190A may display information may be displayed via light emissions via a first orientation, as illustrated in FIG. 3A. In a second example, display device 190B may display information may be displayed via light emissions via a first orientation, as illustrated in FIG. 3C. In another example, display device 190C may display information may be displayed via light emissions via a first orientation, as illustrated in FIG. 3E.

At 915, the information along a first axis of the display device and within a first threshold angle may be obscured. In one example, the information along axis 260A of display device 190A and within $\theta_T$ may be obscured. In a second example, the information along axis 260B of display device 190B and within $\theta_T$ may be obscured. In another example, the information along axis 260C of display device 190C and within $\theta_T$ may be obscured. In one or more embodiments, an anisotropic material, of the display device, may obscure the information along the first axis of the display device and within the first threshold angle. For example, the anisotropic material may include louvers 230. In one instance, louvers 230 may be orthogonal to the first axis. In another instance, louvers 230 may be substantially orthogonal to the first axis (e.g., within a few degrees of orthogonal to the first axis).

At 920, it may be determined that the first orientation changes to a second orientation. In one example, it may be determined that the first orientation of display device 190A, illustrated, in FIG. 3A, changes to a second orientation of display device 190A, illustrated in FIG. 3B. In a second example, it may be determined that the first orientation of display device 190B, illustrated, in FIG. 3C, changes to a second orientation of display device 190B, illustrated in FIG. 3D. In a third example, it may be determined that the first orientation of display device 190C, illustrated, in FIG. 3E, changes to a second orientation of display device 190C, illustrated in FIG. 3F. In another example, it may be determined that the first orientation of display device 190 changes to a second orientation of display device 190, illustrated in FIG. 6B. In one or more embodiments, determining that the first orientation changes to the second orientation may include receiving data from at least one of an electronic accelerometer, an electronic gyroscope, and an electronic magnetometer, among others, and determining that the first orientation changes to the second orientation based at least on the data from the at least one of the electronic accelerometer, the electronic gyroscope, and the electronic magnetometer, among others. In one example, sensors 182-186 may include the electronic accelerometer, the electronic gyroscope, and the electronic magnetometer, respectively. In another example, sensors 482-486 may include the electronic accelerometer, the electronic gyroscope, and the electronic magnetometer, respectively.

At 925, the information along a second axis of the display device and within a second threshold angle may be obscured. In one example, the information along axis 250A of display device 190A and within $\phi_T$ may be obscured. In a second example, the information along axis 250B of display device 190B and within $\phi_T$ may be obscured. In a third example, the information along axis 250C of display device 190C and within $\phi_T$ may be obscured. In another example, the information along axis 250 of display device 190 and within $\phi_T$ may be obscured, illustrated in FIG. 6A. In one or more embodiments, an anisotropic material may obscure the information along the second axis of the display device and within the second threshold angle. For example, the anisotropic material may louvers 240. In one instance, louvers 240 may be orthogonal to the second axis. In another instance, louvers 240 may be substantially orthogonal to the second axis (e.g., within a few degrees of orthogonal to the second axis). In one or more embodiments, obscuring the information along the second axis of the display device and within the second threshold angle may be performed in response to determining that the first orientation changes to the second orientation.

At 930, the information along the first axis of the display device may be permitted to be viewed by a person. In one example, the information along axis 260A of display device 190A, illustrated in FIG. 3B, may be permitted to be viewed by the person. In one instance, the anisotropic material may permit the information along axis 260A of display device 190A to be viewed by the person. In another instance, louvers 230 may permit the information along axis 260A of display device 190A to be viewed by the person. In a second example, the information along axis 260B of display device 190B, illustrated in FIG. 3D, may be permitted to be viewed by the person. In one instance, the anisotropic material may permit the information along axis 260B of display device 190B to be viewed by the person. In another instance, louvers 230 may permit the information along axis 260B of display device 190B to be viewed by the person. In another example, the information along axis 260C of display device 190C, illustrated in FIG. 3F, may be permitted to be viewed by the person. In one instance, the anisotropic material may permit the information along axis 260C of display device 190C to be viewed by the person. In another instance, louvers 230 may permit the information along axis 260C of display device 190C to be viewed by the person. In one or more embodiments, permitting the information along the first axis of the display device to be viewed by the person may be performed in response to determining that the first orientation changes to the second orientation.

In one or more embodiments, one or more of the method and/or process elements and/or one or more portions of a method and/or processor elements may be performed in varying orders, may be repeated, or may be omitted. Furthermore, additional, supplementary, and/or duplicated method and/or process elements may be implemented, instantiated, and/or performed as desired, according to one or more embodiments. Moreover, one or more of system elements may be omitted and/or additional system elements may be added as desired, according to one or more embodiments.

In one or more embodiments, a memory medium may be and/or may include an article of manufacture. For example, the article of manufacture may include and/or may be a software product and/or a program product. For instance, the memory medium may be coded and/or encoded with processor-executable instructions in accordance with one or more flowcharts, systems, methods, and/or processes described herein to produce the article of manufacture. In one or more embodiments, one or more devices and/or one or more systems described herein may include circuitry that is configured in accordance with one or more flowcharts, systems, methods, and/or processes described herein. In one example, the circuitry may include a processor and/or a memory medium coded and/or encoded with processor-executable instructions in accordance with one or more flowcharts, systems, methods, and/or processes described herein. In another example, the circuitry may include other circuitry configured in accordance with one or more flowcharts, systems, methods, and/or processes described herein.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A display device, comprising:
   a plurality of pixels that are configured to emit light;
   an anisotropic material configured to obscure light emitted from the plurality of pixels along two axes of the display device; and
   circuitry configured to:
      display information via light emissions of the plurality of pixels in accordance with a first orientation of the display device relative to a person using the display device;
      obscure, via the anisotropic material, the displayed information along a first axis of the display device and at a viewing angle within a first threshold angle; and
      determine that the orientation of the display device changes from the first orientation to a second orientation;
      in response to determining that the orientation of the display device changes from the first orientation to the second orientation:
         obscure, via the anisotropic material, the displayed information along a second axis of the display device and at a viewing angle within a second threshold angle.

2. The display device of claim 1, wherein the circuitry is further configured to, in response to determining that the orientation of the display device changes from the first orientation to the second orientation:
   permit, via the anisotropic material, the displayed information along the first axis of the display device to be viewed at a viewing angle within the first threshold angle.

3. The display device of claim 1, wherein, to determine that the orientation of the display device changes from the first orientation to the second orientation, the circuitry is further configured to:
   receive data from at least one of an electronic accelerometer, an electronic gyroscope, and an electronic magnetometer; and
   determine that the orientation of the display device changes from the first orientation to the second orientation based at least on the data from the at least one of the electronic accelerometer, the electronic gyroscope, and the electronic magnetometer.

4. The display device of claim 3,
   wherein the at least one of the electronic accelerometer, the electronic gyroscope, and the electronic magnetometer includes the electronic accelerometer; and
   wherein the data from the at least one of the electronic accelerometer, the electronic gyroscope, and the electronic magnetometer is based at least on a first angle with respect to a gravitational center of a planet.

5. The display device of claim 1, wherein the anisotropic material includes a first plurality of strips, having a first height, associated with the first axis and a second plurality of strips, having a second height, associated with the second axis.

6. The display device of claim 5, wherein the second plurality of strips include non-cubic crystal structures that restrict the light emissions of the display device via absorbing at least a portion of the light emissions, along the second axis of the display device and within the second threshold angle, or via diffusing the at least portion of the light emissions, along the second axis of the display device and within the second threshold angle.

7. The display device of claim 5,
   wherein the information is displayed via a first portion of the light emissions; and
   wherein the first plurality of strips obscure the first portion of the light emissions.

8. A method, comprising:
   a display device displaying information via light emissions of the display device in accordance with a first orientation of the display device relative to a person using the display device;
   an anisotropic material, of the display device, obscuring the displayed information along a first axis of the display device and at a viewing angle within a first threshold angle;
   determining that the orientation of the display device changes from the first orientation to a second orientation of the display device; and in response to the determining that the orientation of the display device changes from the first orientation to the second orientation of the display device:
the anisotropic material obscuring the displayed information along a second axis of the display device and at a viewing angle within a second threshold angle.

9. The method of claim 8, further comprising:
in response to the determining that the orientation of the display device changes from the first orientation to the second orientation of the display device:
the anisotropic material permitting the displayed information along the first axis of the display device to be viewed at a viewing angle within the first threshold angle.

10. The method of claim 8,
wherein the determining that the orientation of the display device changes from the first orientation to the second orientation of the display device includes:
receiving data from at least one of an electronic accelerometer, an electronic gyroscope, and an electronic magnetometer; and
wherein the determining that the orientation of the display device changes from the first orientation to the second orientation of the display device is based at least on the data from the at least one of the electronic accelerometer, the electronic gyroscope, and the electronic magnetometer.

11. The method of claim 10,
wherein the at least one of the electronic accelerometer, the electronic gyroscope, and the electronic magnetometer includes the electronic accelerometer; and
wherein the data from the at least one of the electronic accelerometer, the electronic gyroscope, and the electronic magnetometer is based at least on a first angle with respect to a gravitational center of a planet.

12. The method of claim 8, wherein the anisotropic material includes a first plurality of strips, having a first height, associated with the first axis and a second plurality of strips, having a second height, associated with the second axis.

13. The method of claim 12, wherein the second plurality of strips include non-cubic crystal structures that restrict the light emissions of the display device via absorbing at least a portion of the light emissions, along the second axis of the display device and within the second threshold angle, or via diffusing the at least portion of the light emissions, along the second axis of the display device and within the second threshold angle.

14. The method of claim 12,
wherein the information is displayed via a first portion of the light emissions; and
wherein the first plurality of strips obscure the first portion of the light emissions.

15. An information handling system, comprising:
a display that includes a plurality of pixels that are configured to emit light and an anisotropic material configured to obscure light emitted from the pixels along two axes of the display device; and
circuitry configured to:
display information via light emissions of the plurality of pixels in accordance with a first orientation of the display device relative to a person using the display device;
obscure, via the anisotropic material, the displayed information along a first axis of the display device and at a viewing angle within a first threshold angle;
determine that the orientation of the display device changes from the first orientation to a second orientation of the display device; and
in response to determining that the orientation of the display device changes from the first orientation to the second orientation of the display device:
obscure, via the anisotropic material, the displayed information along a second axis of the display device and at a viewing angle within a second threshold angle.

16. The information handling system of claim 15, wherein the circuitry is further configured to, in response to determining that the orientation of the display device changes from the first orientation to the second orientation of the display device:
permit, via the anisotropic material, the displayed information along the first axis of the display device to be viewed at a viewing angle within the first threshold angle.

17. The information handling system of claim 15, further comprising:
at least one of an electronic accelerometer, an electronic gyroscope, and an electronic magnetometer coupled to the circuitry;
wherein the circuitry is further configured to:
receive data from the at least one of the electronic accelerometer, the electronic gyroscope, and the electronic magnetometer; and
wherein, to determine that the orientation of the display device changes from the first orientation to the second orientation of the display device, the circuitry is further configured to:
determine that the orientation of the display device changes from the first orientation to the second orientation of the display device based at least on the data from the at least one of the electronic accelerometer, the electronic gyroscope, and the electronic magnetometer.

18. The information handling system of claim 17,
wherein the at least one of the electronic accelerometer, the electronic gyroscope, and the electronic magnetometer includes the electronic accelerometer; and
wherein the data from the at least one of the electronic accelerometer, the electronic gyroscope, and the electronic magnetometer is based at least on a first angle with respect to a gravitational center of a planet.

19. The information handling system of claim 15, wherein the anisotropic material includes a first plurality of strips, having a first height, associated with the first axis and a second plurality of strips, having a second height, associated with the second axis.

20. The information handling system of claim 19, wherein the second plurality of strips include non-cubic crystal structures that restrict the light emissions of the display device via absorbing at least a portion of the light emissions, along the second axis of the display device and within the second threshold angle, or via diffusing the at least portion of the light emissions, along the second axis of the display device and within the third threshold angle.

* * * * *